(12) United States Patent
Kikuta et al.

(10) Patent No.: US 10,896,358 B2
(45) Date of Patent: Jan. 19, 2021

(54) IMAGE PROCESSING APPARATUS, DISPLAY SYSTEM, IMAGE PROCESSING METHOD AND STORAGE MEDIUM FOR PROJECTING A MOVING IMAGE ONTO PRINTED MATTER IN AN OVERLAPPING MANNER

(71) Applicant: CANON KABUSHIKI KAISHA, Tokyo (JP)

(72) Inventors: Kyohei Kikuta, Tokyo (JP); Hideki Kubo, Kawasaki (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/417,736

(22) Filed: May 21, 2019

(65) Prior Publication Data

US 2019/0362202 A1 Nov. 28, 2019

(30) Foreign Application Priority Data

May 25, 2018 (JP) ................................. 2018-100784

(51) Int. Cl.
*G06K 15/12* (2006.01)
*H04N 1/028* (2006.01)
*H04N 1/00* (2006.01)

(52) U.S. Cl.
CPC ....... *G06K 15/1276* (2013.01); *G06K 15/128* (2013.01); *H04N 1/00167* (2013.01); *H04N 1/028* (2013.01)

(58) Field of Classification Search
CPC .. G06K 15/1276; G06K 15/128; H04N 1/028; H04N 1/00167; H04N 1/6027; H04N 1/6075; H04N 1/00267; H04N 1/6097; H04N 1/3871; H04N 1/60; H04N 1/387; H04N 1/6002
See application file for complete search history.

(56) References Cited

U.S. PATENT DOCUMENTS

| 9,485,388 | B2 | 11/2016 | Kodama et al. |
| 9,734,439 | B2 | 8/2017 | Hara et al. |
| 9,749,496 | B2 | 8/2017 | Fujimoto et al. |
| 10,027,848 | B2 | 7/2018 | Fuse et al. |
| 10,043,118 | B2 | 8/2018 | Sumi et al. |

(Continued)

FOREIGN PATENT DOCUMENTS

JP 2010103863 A 5/2010

*Primary Examiner* — Kent Yip
(74) *Attorney, Agent, or Firm* — Carter, Deluca & Farrell LLP

(57) ABSTRACT

To make it possible to appropriately reproduce a desired color in a case where it is desired to change hue of a specific area on a reproduced image obtained by projecting a projection image onto printed matter in an overlapping manner. In an image processing apparatus, a print image for outputting printed matter by a printer onto which a moving image in which color of an object changes in a time series is projected in an overlapping manner is generated. The image processing apparatus acquires an image at least including the object whose color changes. Then, the image processing apparatus generates the print image by performing saturation reduction processing for an area of the object whose color changes in the acquired image.

17 Claims, 16 Drawing Sheets

(56) References Cited

U.S. PATENT DOCUMENTS

| | | |
|---|---|---|
| 10,057,459 B2 | 8/2018 | Yamamoto et al. |
| 10,063,743 B2 | 8/2018 | Fuse et al. |
| 10,073,370 B2 | 9/2018 | Takikawa et al. |
| 10,187,553 B2 | 1/2019 | Takesue et al. |
| 10,194,053 B2 | 1/2019 | Otani et al. |
| 2005/0140996 A1* | 6/2005 | Horiuchi ................ H04N 1/56 358/1.9 |
| 2008/0049044 A1* | 2/2008 | Nitta ...................... G03B 21/14 345/634 |
| 2010/0104176 A1* | 4/2010 | Hayase ................ H04N 1/3871 382/162 |
| 2017/0139363 A1 | 5/2017 | Takikawa et al. |
| 2017/0324885 A1 | 11/2017 | Ochiai et al. |
| 2019/0156164 A1 | 5/2019 | Yanai et al. |

\* cited by examiner

IMAGE PROCESSING APPARATUS, DISPLAY SYSTEM, IMAGE PROCESSING METHOD AND STORAGE MEDIUM FOR PROJECTING A MOVING IMAGE ONTO PRINTED MATTER IN AN OVERLAPPING MANNER

BACKGROUND OF THE INVENTION

Field of the Invention

The present invention relates to an image processing technique for projecting a moving image onto printed matter in an overlapping manner.

Description of the Related Art

In recent years, in an image input device, such as a digital camera, extension of a dynamic range (hereinafter, called "D range") an image capturing sensor can capture has been progressing. Further, the technique has been put to practical use, which extends the D range by performing image capturing by changing exposure conditions at the time of image capturing and combining a plurality of images whose exposure conditions are different. On the other hand, also in an image output device, such as a projector and a printer, luminance and contrast have been increased and the D range that can be reproduced is extended, but generally, the level thereof does not reach that of the D range of an image input device. Because of this, for example, the color gamut of image information captured by a digital camera is compressed and then output by a printer or a projector.

Regarding this point, for example, Japanese Patent Laid-Open No. 2010-103863 has disclosed a technique to extend the D range and the color gamut, which can be reproduced, by projecting an image onto printed matter output by a printer in an overlapping manner by a projector. According to this technique, it is possible to reproduce an input image more faithfully and an effective use of the technique for a signage and a simulation is expected.

In the above-described technique to project an image onto printed matter in an overlapping manner, in a case where a projection imaged from a projector is changed in a time series (for example, in a case where a moving image is projected), the quality of the overlap results changes sometimes depending on timing. Specifically, in a case where the hue of a specific area in an image to be reproduced (hereinafter, called a "reproduced image") in an overlapping manner is changed by changing the projection image in a time series, the color of the specific area sometimes becomes darker than the target color depending on the contents of the projection image.

Consequently, an object of the present invention is to make it possible to preferably reproduce a desired color in a case where it is desired to change hue of a specific area on a reproduced image in a time series, which is obtained by projecting a projection image onto printed matter in an overlapping manner.

SUMMARY OF THE INVENTION

The image processing apparatus according to the present invention is an image processing apparatus that generates a print image for outputting printed matter by a printer onto which two or more images are projected in an overlapping manner, and includes: an acquisition unit configured to acquire an image at least including an object; and a first generation unit configured to generate the print image by performing saturation reduction processing for an area of the object in the acquired image.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
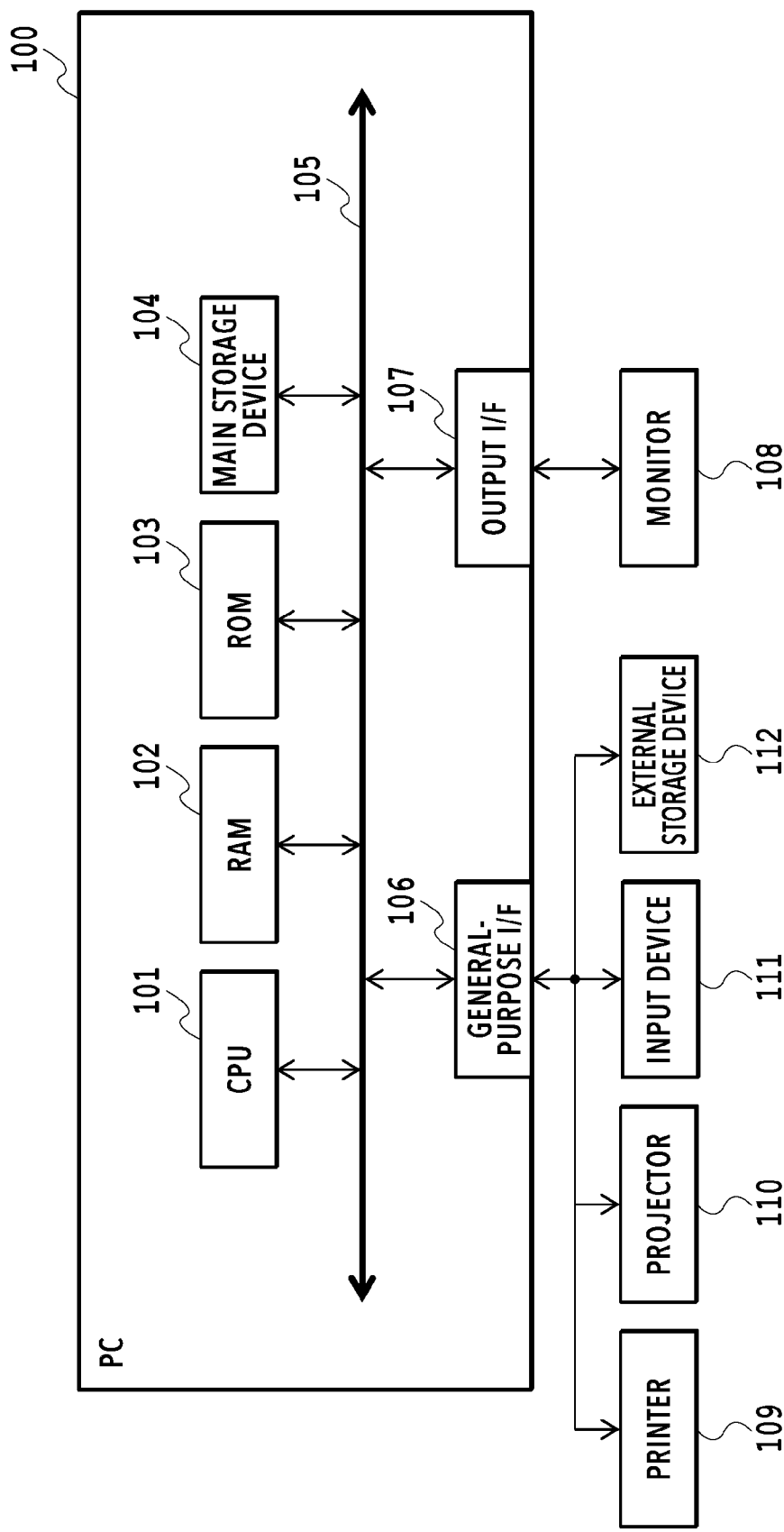
FIG. 1 is a diagram showing an example of a configuration of a display system.

FIG. 1 is a diagram showing an example of a configuration of a display system to change the color of a specific area (specific object) on printed matter by projecting in an overlapping manner a projection image whose contents are different in a time series by using a projector onto the printed matter, such as a poster, posted on a wall or the like. The display system in FIG. 1 has an image processing apparatus (PC) 100, a monitor 108, an image forming apparatus (printer) 109, an image projection device (projector) 110, an input device 111, and an external storage device 112. Further, PC 100 internally has a CPU 101, a RAM 102, a ROM 103, a main storage device 104, a main bus 105, a general-purpose interface (I/F) 106, and an output I/F 107. First, the hardware configuration of the PC 100 is explained.

The CPU 101 is a processor that centralizedly controls each unit within the PC 100. The RAM 102 functions as a main memory, a work area, and the like of the CPU 101. The ROM 103 and the main storage device 104 store program groups and various applications for implementing various kinds of processing including generation of a print image and a projection image, to be explained below, data used for various kinds of processing, and the like. The main bus 105 connects each unit of the PC 100. The general-purpose I/F 106 is a serial bus interface, such as USB and IEEE 1394. The monitor 107 is, for example, a liquid crystal display and functions as a user interface of the PC 100. The printer 109 forms an image on a sheet by, for example, the ink jet scheme, in accordance with a still image (hereinafter, called "print image") for printing generated by the PC 100 and outputs the above-described printed matter. The projector 110 projects in an overlapping manner a projection image whose contents are different in a time series onto printed matter, such as a poster posted on a wall. The input device 111 is a keyboard or a mouse for a user to perform various instruction operations. The external storage device 112 is a large-capacity storage device, such as an external HDD, and stores data, such as a moving image captured by an image capturing device (digital camera), not shown schematically, and supplies the data to the PC 100.

The PC 100 is controlled by the CPU 101 and reads moving image data stored in the external storage device 112 and performs image processing, to be described later, and generates print image data and projection image data. The generated print image data is supplied to the printer 109 and the generated projection image data is supplied to the projector 110 via the general purpose I/F 106. Then, the printer 109 performs printing processing based on the supplied print image data and outputs printed matter. By the printed matter output from the printer 109 being posted at a predetermined position by a user and the projection image being projected in an overlapping manner onto the printed matter from the projector 110, a higher-quality reproduced image whose D range and color gamut are extended is obtained.

<Software Configuration of PC>

Figure 2:
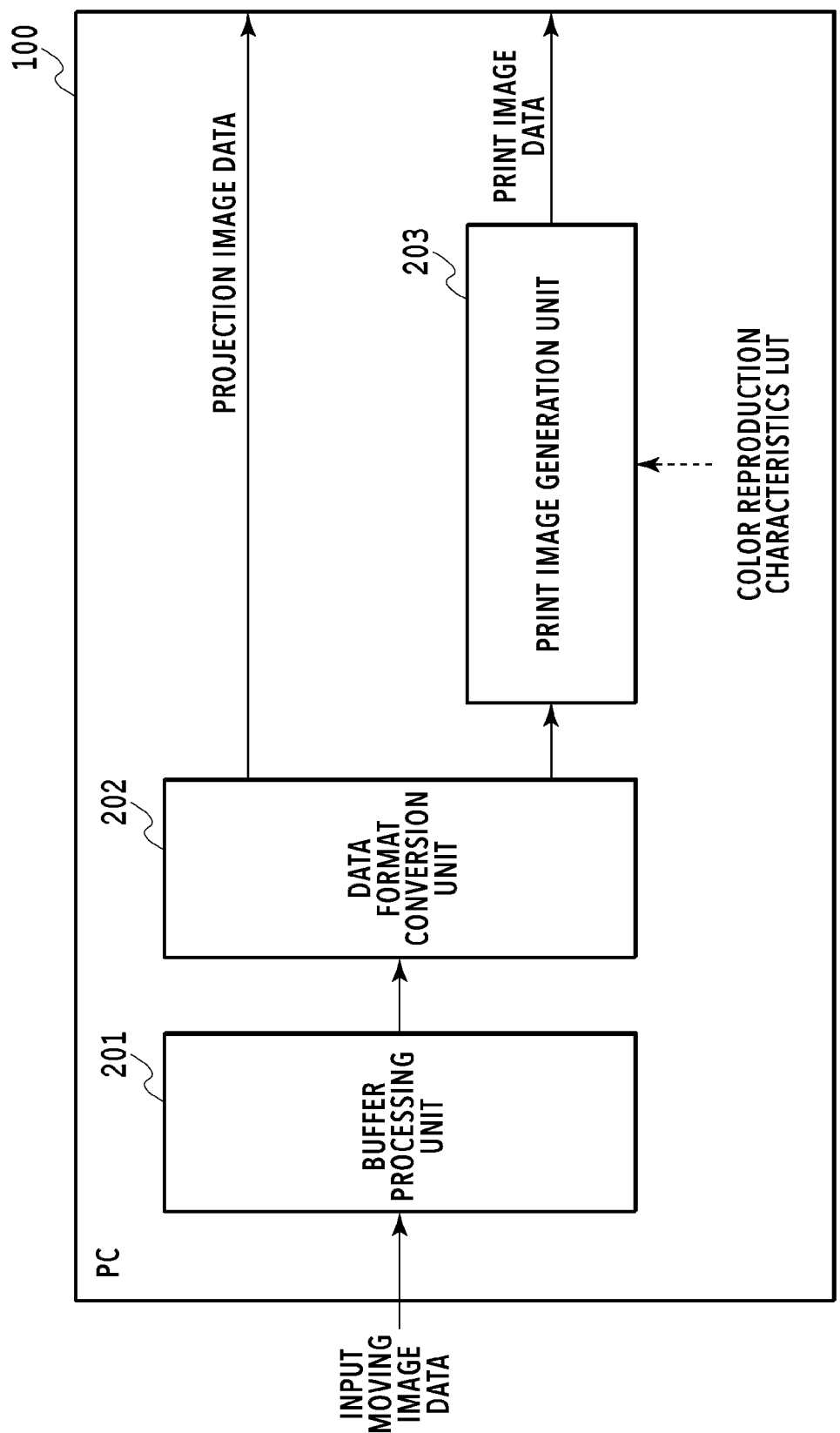
FIG. 2 is a function block diagram showing a software configuration of a PC according to a first embodiment.

FIG. 2 is a function block diagram showing a software configuration of the PC 100 according to the image processing of the present embodiment. The PC 100 of the present embodiment includes a buffer processing unit 201, a data format conversion unit 202, and a print image generation unit 203. The buffer processing unit 201 secures a predetermined storage area (image buffer) within the RAM 102 and stores processing-target moving image data. The data format conversion unit 202 converts the moving image data stored in the image buffer into a predetermined digital format as needed. For example, the data format conversion unit 202 performs decode processing of input moving image data. Generally, the data capacity of the moving image captured by a digital camera or the like is likely to become large, and therefore, in many cases, the moving image data is encoded for the purpose of reducing the data capacity (for example, H.264 and the like). However, in the encoded state, it is not possible to make use of the moving image as a projection image and the moving image is not suitable to the processing by the next print image generation unit 203, and therefore, the moving image data is decoded and converted into the data format suitable to the processing. By the conversion processing such as this, in the present embodiment, the pixel value of each pixel in each frame configuring the input moving image data is converted into the data format represented in the RGB color space. That is, an RGB value $(r, g, b)$ at a pixel position $(x, y)$ at time $t$ of a converted input moving image V is brought into a state where the RGB value is known at any $t$, $x$, and $y$. In the present embodiment, each value of RGB is represented by 16 bits (0 to 65535) and $(R, B)=(0, 0, 0)$ represents black and $(R, G, B)=(65535, 65535, 65535)$ represents white. There may be a case where a plurality of pieces of moving image data is input, whose exposure conditions are different and prepared with, for example, HDR (High Dynamic Range) imaging in mind. In this case, the data format conversion unit 202 performs processing to make it possible to handle each piece of moving image data by the pixel value on the same basis. Further, in a case where the color space of the input moving image data is a color space other than RGB, necessary color space conversion processing is also performed in the data format conversion unit 202. Then, in the present embodiment, the moving image data in which each pixel value of each frame is represented in the RGB color space is output as the image data to be projected by the projector 110.

The print image generation unit 203 generates a print image to be supplied to the printing processing in the printer 109 from the input moving image. A broken-line arrow toward the print image generation unit 203 represents that a "color reproduction characteristics LUT (lookup table)" is referred to in the print image generation processing and this will be explained in a third embodiment.

<Print Image Generation Processing>

Figure 3:
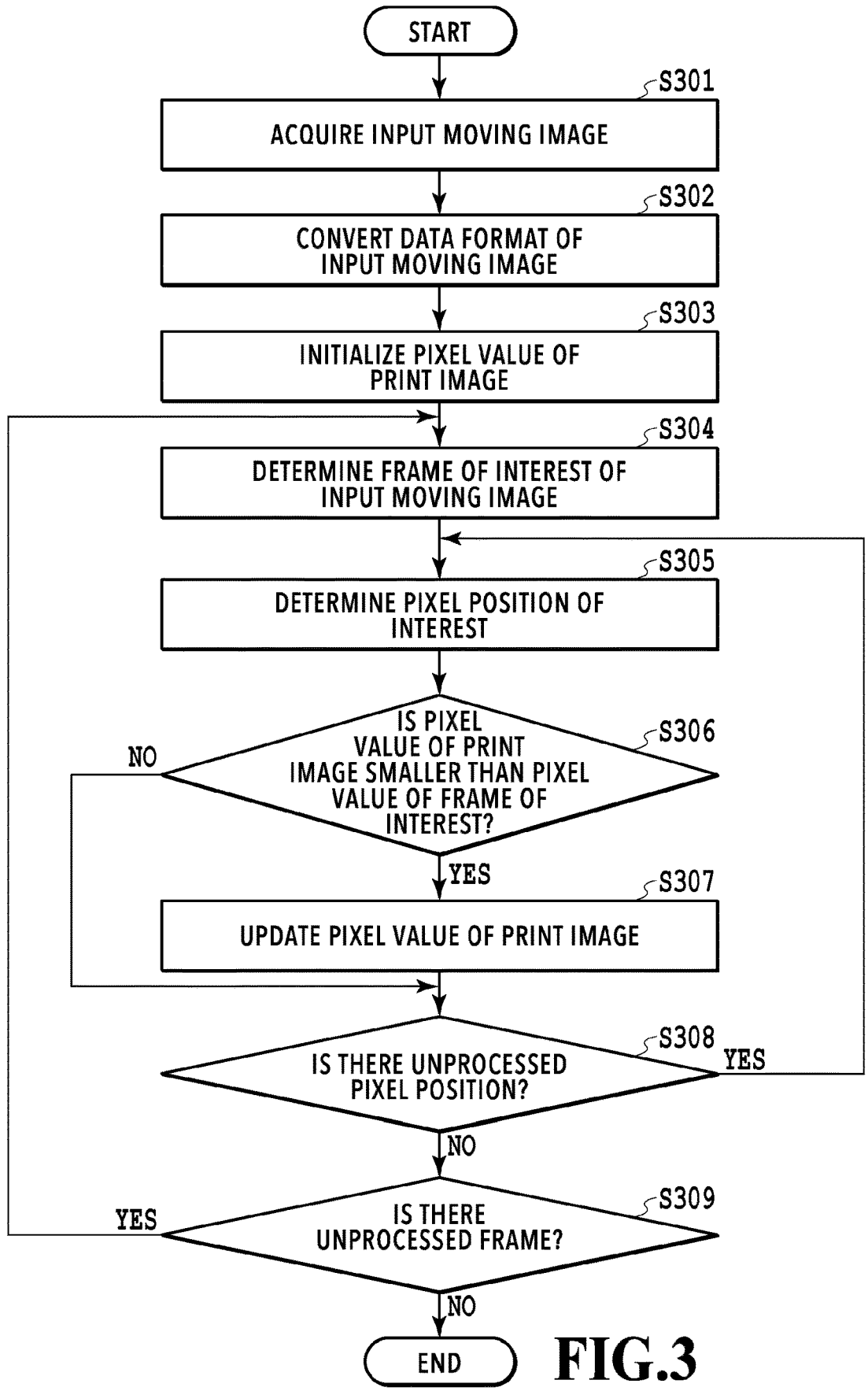
FIG. 3 is a flowchart showing a flow of print image generation processing according to the first embodiment.

FIG. 3 is a flowchart showing a flow of the print image generation processing according to the present embodiment by the print image generation unit 203. In the following, detailed explanation is given with reference to the flow in FIG. 3. In the following explanation, symbol "S" represents a step.

At S301, the input moving image data is stored in the RAM 102 by the buffer processing unit 201. The input moving image of the present embodiment is a moving image that is made use of as it is as the projection image and the hue of at least a part of the object existing in each frame changes in a time series. At S302 that follows, the input moving image data stored in the RAM 102 is read and the processing to convert into the predetermined data format as described above is performed by the data format conversion unit 202. Due to this, the input moving image data is converted into the data format in which each pixel in each frame configuring the input moving image has a pixel value represented in the device-dependent RGB color space.

At S303, all the pixel values of the print image to be generated are initialized. Specifically, as the initial value of each pixel, the pixel value in the frame at time $t=0$ of the input moving image is set. At S304 that follows, a frame of interest is determined from the frames configuring the input moving image. Normally, from the frame at time $t=0$ (top frame), the frame becomes the frame of interest in order. At S305, the pixel position of interest $(x, y)$ is determined. Normally, from the pixel position $(x, y)=(0, 0)$ with the tope left of the frame being taken to be the origin, the pixel position becomes the pixel position of interest in order.

At S306, the pixel value of the print image at the current point in time at the pixel position of interest is compared with the pixel value in the frame of interest. In a case where the pixel value of the frame of interest is larger than the pixel value of the print image, the processing advances to S307. In other cases, the processing advances to S308.

At S307, the pixel value of the print image at the pixel position of interest is updated. Specifically, a pixel value I $(x, y)$ of the print image at the pixel position of interest $(x, y)$ is replaced with a pixel value V $(t, x, y)$ of the moving image in the frame of interest t at the same pixel position of interest (x, y). In this manner, the pixel value of the print image at the pixel position of interest is updated sequentially and the maximum pixel value within all the frames of the input moving image is left as the pixel value of the print image. Then, this processing is performed for each channel of RGB. For example, it is assumed that the pixel value of the moving image V(t=0, x, y) is (R, G, B)=(65535, 0, 0), (R, G, B)=(65535, 0, 0) is set as the initial value of the print image I(x, y) at a certain pixel position (x, y), and that the pixel value in a frame of interest V(t=1, x, y) is (R, G, B)=(65280, 248, 260). In this case, the G component and the B component in the frame of interest are larger than those of the initial value, and therefore, the pixel value of the print image I(x, y) is updated to (R, G, B)=(65535, 248, 260). Then, it is assumed that the pixel value in the next frame of interest V(t=2, x, y) is (R, G, B)=(65025, 496, 520). Similarly, the larger component of the RGB value is taken, and therefore, the pixel value of the print image I(x, y) is updated to (R, G, B)=(65535, 496, 520). In this manner, for all the pixel positions, only the maximum pixel value in all the frames is left as a result I(x, y).

At S308, whether the processing is completed for all the pixel positions of the print image is determined. In a case where there is an unprocessed pixel position, the processing returns to S305, and the next pixel position of interest (x, y) is determined and the processing is continued. On the other hand, in a case where the processing is completed for all the pixel positions, the processing advances to S309.

At S309, whether the processing of all the frames of the input moving image is completed is determined. In a case where there is an unprocessed frame, the processing returns to S304, and the next frame of interest is determined and the processing is continued. In a case where the processing is completed for all the frames of the input moving image, this processing is terminated. Then, I (x, y) at the point in time of termination of this processing is print image data to be output from the print image generation unit 203.

The above is the contents of the print image data generation processing according to the present embodiment. As described above, in the present embodiment, each frame of the input moving image is referred to, which is the projection image, and the print image is generated by taking into consideration the change over time thereof.

<Meaning of Generating Print Image From Input Moving Image>

Figure 4:
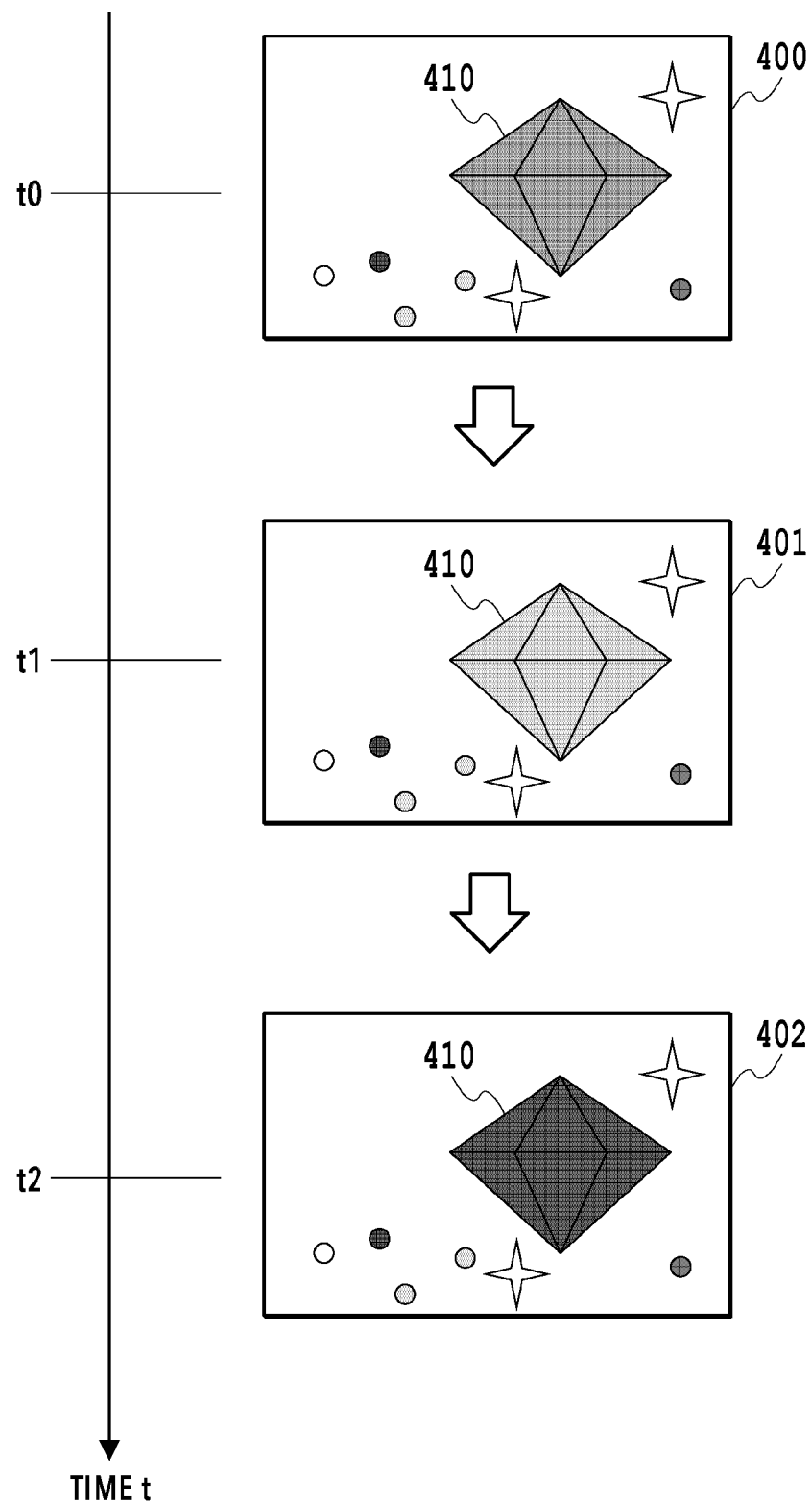
FIG. 4 is a diagram showing an example of a frame configuring an input moving image.

The meaning of generating a still image (print image) for printed matter, which is the projection destination, by referring to each frame of an input moving image used as a projection image and taking into consideration the change over time thereof as described above is explained. FIG. 4 is a diagram showing an example of a frame configuring an input moving image. In this example, an image 400 indicates a frame at time t0, an image 401 indicates a frame at time t1, and an image 402 indicates a frame at time t2, respectively. It is assumed that a moving object does not exist in this moving image scene and the color in the area of an object 410 like a jewel changes as time elapses. Specifically, it is assumed that the color of the object 410 is red at t0 and changes to green at t1, and to blue at t2 in order.

Figure 5:
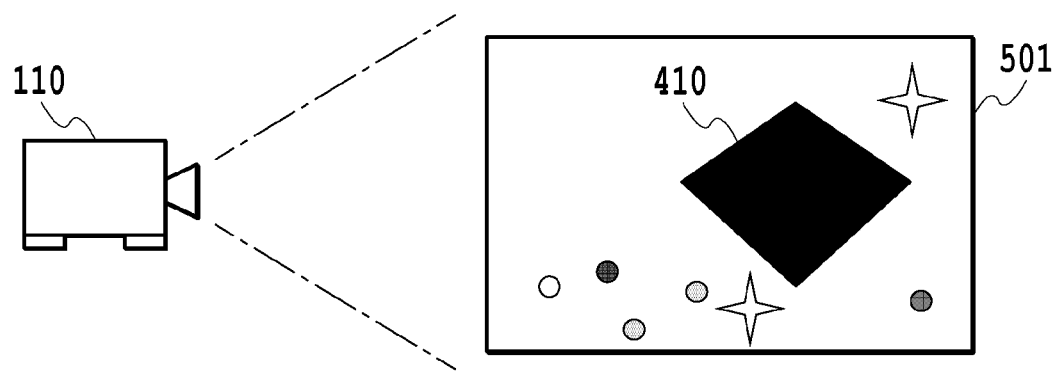
FIG. 5 is a diagram showing an example of a reproduced image that appears on printed matter.

In a case where an arbitrary frame is selected from a plurality of frames configuring an input moving image and adopted as a print image and the input moving image is projected onto the printed matter, which is the output result thereof, in an overlapping manner, sometimes the original effect is not obtained. For example, it is assumed that the frame at t0 is adopted as a print image and each frame at time t0 to time t2 is projected onto the printed matter thereof in order. FIG. 5 shows a part of a reproduced image that appears on the printed matter in this case. As shown in FIG. 5, in a reproduced image 501, a phenomenon occurs that the color of the object 410 whose color changes becomes a different dark color (becomes close to black, saturation is reduced, and brightness is reduced) in each frame at t0 to t2.

Figure 6:
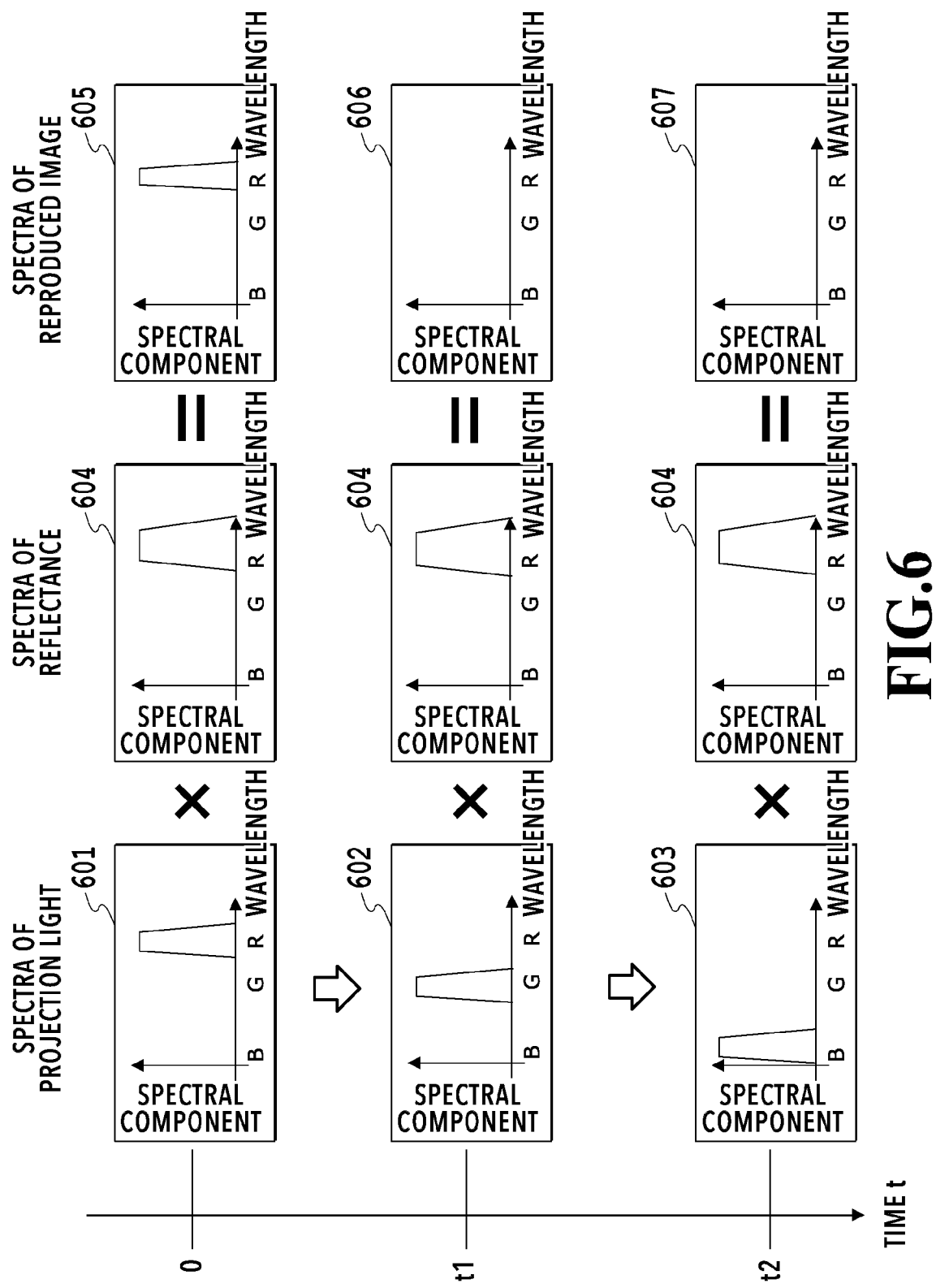
FIG. 6 is a diagram explaining a problem of the present invention.

The reason is explained by using FIG. 6. FIG. 6 is a diagram schematically showing the spectra of the colors of the object 410 like a jewel in each frame at t0 to t2. In each of graphs 601 to 607, the horizontal axis represents the wavelength of light and the vertical axis represents the intensity of the spectral component. On the horizontal axis, the approximate color corresponding to the wavelength band is represented by B (blue), G (green), and R (red) in accordance with the wavelength. Each of the graphs 601 to 603 represents the spectral component of the light projected by the projector 110 and it is known that the color changes from red to green and from green to blue as time changes from t0 to t2. On the other hand, the graph 604 represents the spectral component of reflectance of the print image. Here, the print image is in the frame at t0 and remains unchanged irrespective of time t and has the red spectral component. However, the width of the spectral component is greater than the width of the spectral component of the light projected from the projector 110 and it cannot be said that both coincide completely with each other. The reason is that the color reproduction characteristics are different between the printer 109 and the projector 110 even for the same red.

Here, the spectral component in a reproduced image in a case where the projection image is projected onto the print image in an overlapping manner is obtained by multiplying the spectral component of the light projected by the projector 110 and the spectral component of reflectance of the print image for each wavelength. The graph 605 to 607 represent the multiplication results at t0 to t2. In the graph 605 corresponding to t0, the overlap portion of the spectral component in the graph 601 and the spectral component of the graph 604 remains. The width of the spectral component in the graph 605 is narrower than those both in the graph 601 and in the graph 604 and this means that more vivid red is obtained. In this manner, a reproduced image obtained by projecting a projection image in an overlapping manner brings about, the effect to increase saturation and contributes to extension of the D range and the color gamut.

On the other hand, in the graph 606 corresponding to t1 and in the graph 607 corresponding to t2, there is almost no wavelength band in which the spectral component of the projection light and the spectral component of reflectance overlap, and therefore, the spectral component in the reproduced image becomes almost zero in the entire wavelength band. Due to this, the reflected light from the printed matter becomes difficult to perceive. This is the reason that the color of the object whose color is changed by projecting projection images different in a time series in an overlapping manner is reproduced as a different dark color for each projection image at each timing.

Figure 7:
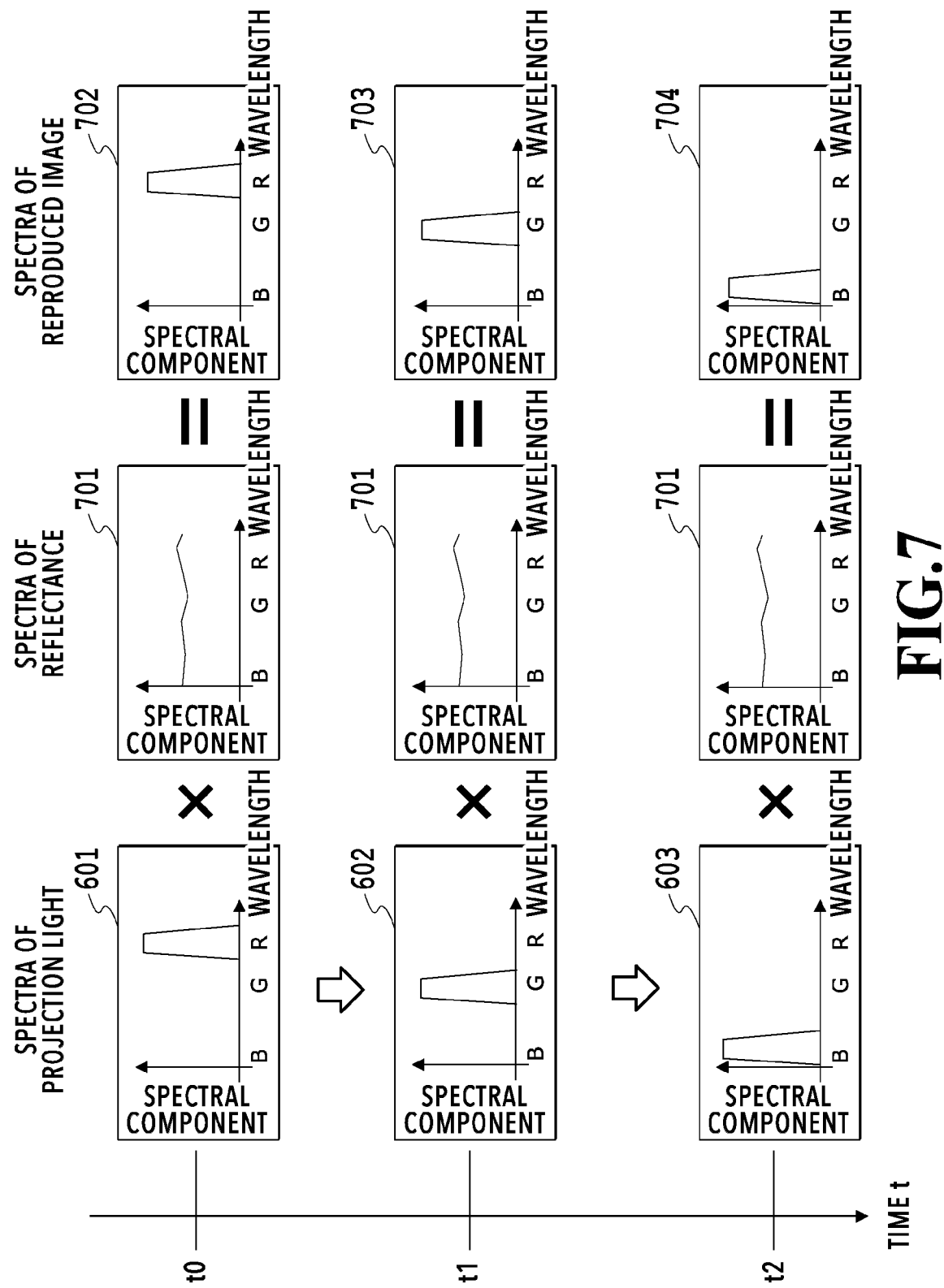
FIG. 7 is a diagram explaining a problem of the present invention.

It is known from FIG. 6 that the above-described problem is likely to occur at the portion at which the color changes comparatively largely as time elapses, that is, in the image area in which the hue changes and the wavelength band of the spectral component is narrow (=color is vivid). Then, even in the image area in which the color changes comparatively largely as time elapses, in a case where the saturation of the print image is low or in a case where the color is an achromatic color, such a problem is unlikely to occur. The reason is that as shown in FIG. 7, in these cases, the width (wavelength band) of a spectral component 701 of reflectance is wide, and therefore, even though the hue changes, the spectral component of the projection light remains in the multiplication results (graph 702 to 704) by the spectral component of the projection light.

From the above fact, it is known that it is possible to avoid the occurrence of the above-described problem by suppressing the saturation of the print image. However, it is also desirable to avoid such a situation in which it is no longer possible to obtain the effect to increase saturation by projecting a projection image in an overlapping manner by doing so. Further, in a case where only the avoidance of the occurrence of the above-described problem is taken into consideration, for example, there is such a method of coping with the problem by representing the portion at which the color changes in solid white on the printed matter. However, by such a coping method, it is no longer possible to obtain another effect to reinforce a feeling of resolution obtained by projecting a projection image in an overlapping manner. In a case where an image is projected from the projector, deterioration of a feeling of resolution of an image is likely to occur because a shift occurs in the focus resulting from an inclination of the position and orientation of the main body and a shift in the projection surface. However, in the printed matter, the resolution does not change after the output, and therefore, by projecting a projection image from the projector onto the image in the printed matter in an overlapping manner, it is possible to obtain the effect to reinforce a feeling of resolution in the reproduced image. Further, it is possible for the dark color of, such as the contour, to give a clearer impression by representing both the image in the printed matter and the projection image from the projector dark to increase a feeling of contrast. Consequently, although there is a risk that the area in which the color changes largely as time elapse becomes dark in a reproduced image, it is easier to obtain the effect of the projection in an overlapping manner in a case where image information representing the shape and color of the object at the portion at which color changes is left in the print image.

With the above in mind, as one policy in a case where a print image is generated from a projection image (=input moving image), it is considered to generate a print image by reducing saturation on the whole. In this case, it is possible to obtain the effect, such as an increase in saturation, to a certain extent while obtaining resistance to a change in projected color. However, it is possible to obtain more merits by the projection in an overlapping manner by the following policy. The policy is that in a case where there is a change in color in at least a part of the area, such as a specific object in a moving image to be projected, particularly in an area in which the hue changes largely, saturation in the area in the print image is suppressed to low and breaking of color reproduction as time elapses is suppressed, and on the other hand, in an area in which the hue in the moving image to be projected does not change largely, saturation is not suppressed and the effect to extend the D range and the color gamut at the time of the projection in an overlapping manner is sought. By doing so, it is also possible to obtain the effect by the projection in an overlapping manner while avoiding breaking of an image due to the change (see FIG. 6).

In the present embodiment, by the method in which all the frames of the input moving image are referred to and the maximum pixel value at each pixel position is adopted, the print image, which is the source of the printed matter, is generated. By this method, in the area of the object 410 like a jewel described previously in which the color change, for example, from red to green and then to blue, I (x, y) of each channel of RGB will be as follows. Here, it is assumed that the RGB value representing red is (65535, 0, 0), the RGB value representing green is (0, 65535, 0), and the RGB value representing blue is (0, 0, 65535). Then, the RGB value of I (x, y) of each channel in a case where the processing is completed for all times t will be (65535, 65535, 65535). That is, the RGB value represents white. In this manner, in the area of the object 410 like a jewel, saturation is suppressed. Further, the RGB value representing red may be, for example, (54000, 0, 0), that is, each value of RGB is not required to be "65535", which is the maximum value. The same applies to green and blue. In this case, the RGB value of I (x, y) is (54000, 54000, 54000) and represents gray close to white, and therefore, it is also possible to suppress saturation. In a case where each value of RGB approximates to one another, the effect of saturation reduction is obtained, and therefore, the values do not need to be the same completely. In this manner, in each pixel, the maximum value remains and the color becomes close to white, and therefore, saturation is suppressed finally. On the other hand, at the portion other than the object 410 (image area in which the color hardly changes as time elapses), the RGB value whose value is almost constant across a plurality of frames remains as it is, and therefore, it is possible to keep saturation as it is.

Modification Example

In the present embodiment, in order to put the color close to white for which it is possible to use the D range of the projector 110 as it is (on the basis of white screen), the maximum value at each pixel position is adopted for each channel of RGB, but it may also be possible to put the color close to, for example, gray. That is, it may also be possible to adopt one close to the intermediate value ("32768" in a case of 16 bits) at each pixel position. Further, in a case where many colors are caused to make a transition, it is supposed that the average value of the colors becomes close to an achromatic color, and therefore, it may also be possible to adopt the average value in place of the maximum value.

Furthermore, in the present embodiment, the saturation reduction processing is performed for the entire object whose color changes, but it may also be possible to perform the saturation reduction processing by excluding the edge portion of the object. Specifically, it may also be possible to extract the edge component of an object whose color changes, to perform the saturation reduction processing by taking only the internal area thereof as a target, and to leave the non-edge component as it is.

Further, in the present embodiment, a print image is generated from an input moving image, but this is not limited. For example, it may also be possible to generate a print image by performing processing to rewrite the RGB value of each pixel configuring an object whose color changes in a still image prepared by capturing the same scene as that of an input moving image so that each value becomes the same. At this time, by replacing one of the three components of RGB with the maximum value, a color closer to white is obtained. Further, it may also be possible to replace the three components of RGB with the average value of the three components of RGB. In this manner, it is also possible to perform the method of reducing saturation without referring to an input moving image.

As above, according to the present embodiment, a print image is generated by taking into consideration the change over time of a part of an object in a plurality of projection images. Due to this, in a case where at least two projection images whose color of a part of an object is different are projected onto printed matter in an overlapping manner, it is possible to prevent the portion at which it is desired to cause a change in color to occur in a reproduced image from becoming dark.

Second Embodiment

In the first embodiment, the aspect is explained in which a print image is generated from a moving image planned to be used as a projection image and the moving image is projected onto the obtained printed matter in an overlapping manner. In a case of this aspect, it is possible to suppress the portion at which it is desired to cause a change in color to occur in a reproduced image from being reproduced as a dark color, but at the same time, there is a disadvantage that the reproduced image becomes a color too bright and vivid on the whole. Consequently, an aspect is explained as a second embodiment in which a projection image is reconstructed in accordance with a print image so as to prevent such a disadvantage from occurring in a reproduced image.

Explanation of the contents in common to those of the first embodiment, such as the basic configuration of the display system, is omitted and in the following, different points are explained mainly.

Figure 8:
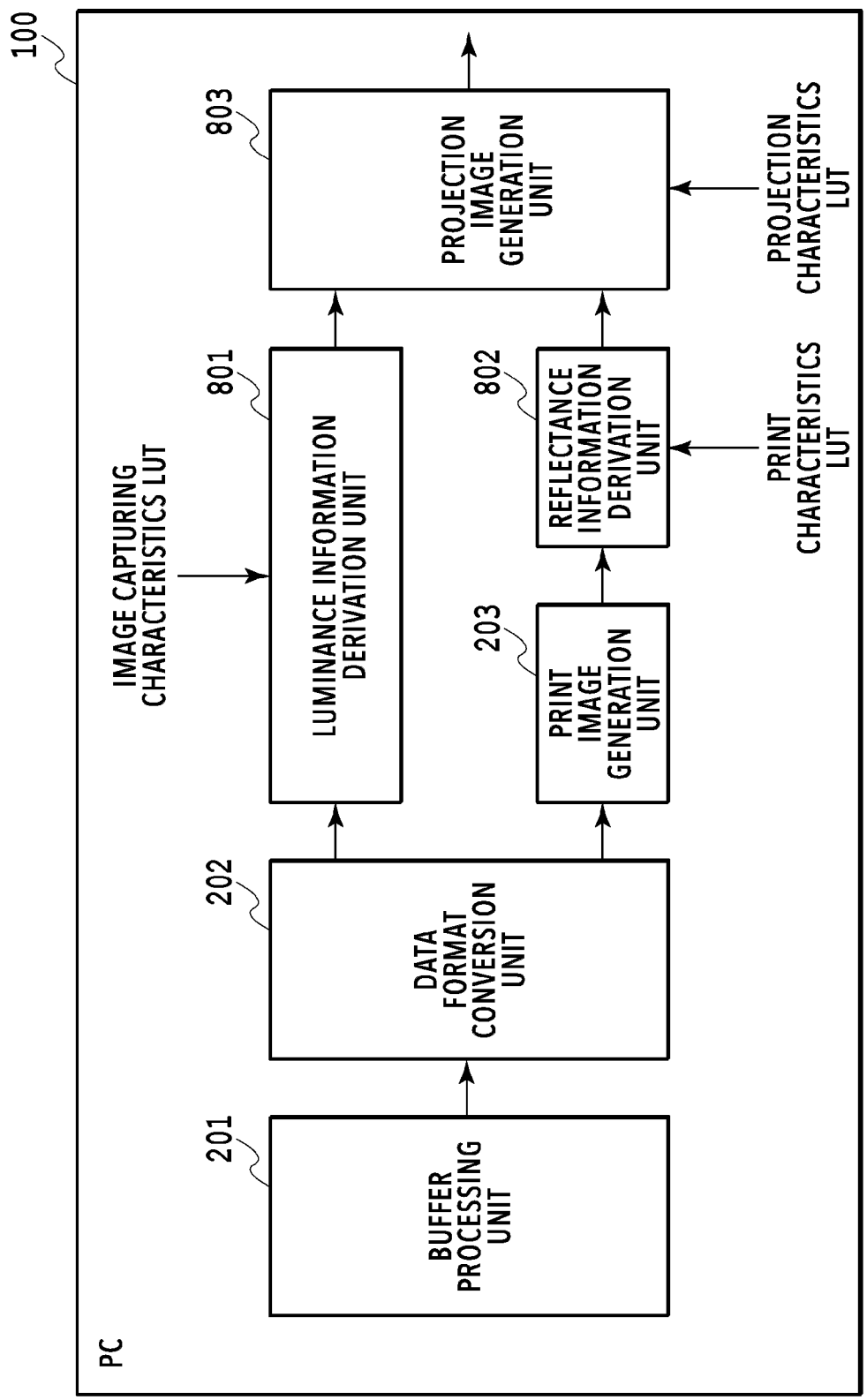
FIG. 8 is a function block diagram showing a software configuration of a PC according to a second embodiment.
Figure 9:
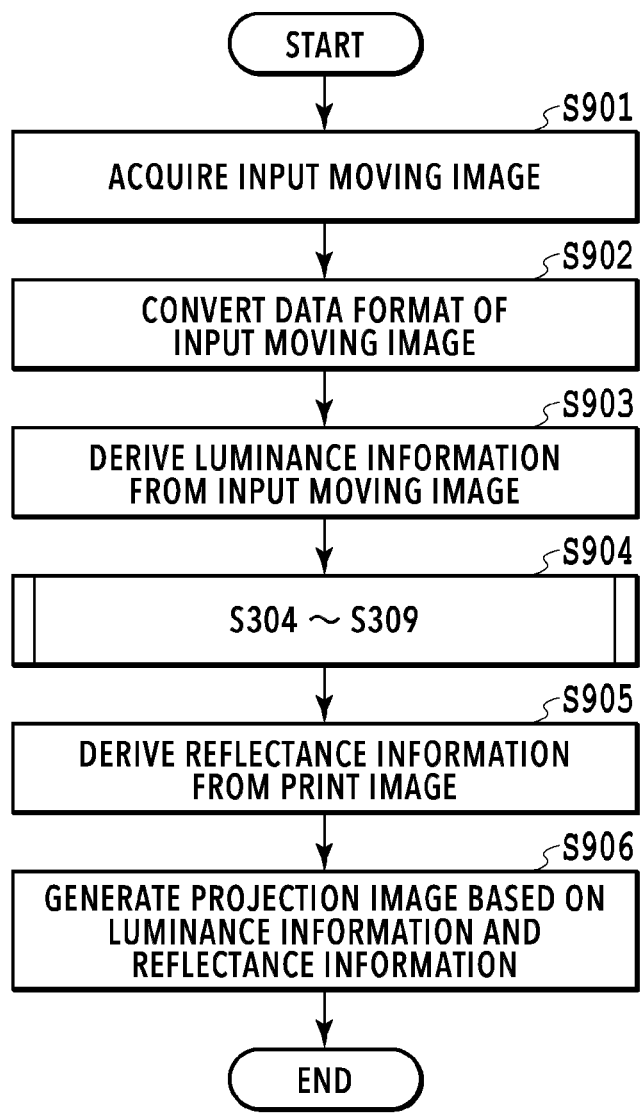
FIG. 9 is a flowchart showing a flow of entire image processing in the second embodiment.

FIG. 8 is a function block diagram showing a software configuration of the PC 100 according to image processing of the present embodiment. The PC 100 of the present embodiment has a luminance information derivation unit 801, a reflectance information derivation unit 802, and a projection image generation unit 803, in addition to the buffer processing unit 201, the data format conversion unit 202, and the print image generation unit 203. FIG. 9 is a flowchart showing a flow of the entire image processing in the present embodiment. In the following, along the flow in FIG. 9, processing in each function block shown in FIG. 8 is explained.

S901 and S902 correspond to S301 and S302, respectively, in the flow in FIG. 3 of the first embodiment. That is, after input moving image data is stored in the RAM 102 by the buffer processing unit 201, the input moving image data is converted into moving image data in which each pixel within a frame has the RGB value by the data format conversion unit 202.

At S903, the luminance information derivation unit 801 derives luminance information from the input moving image after the data format conversion. Specifically, the luminance information derivation unit 801 converts the RGB value of each pixel in each frame of the input moving image into device-independent tri-stimulus value XYZ (hereinafter, simply described as "XYZ") representing luminance. Here, the way of thinking in a case where luminance information is derived from an input moving image is explained. Generally, in a digital camera, physical luminance information (XYZ) of a scene to be captured is converted into a signal value by an image capturing sensor and then stored. The signal value thus stored has a linear relationship with the luminance information before the conversion. Then, a specific correspondence relationship between the luminance information and the signal value changes depending on the exposure condition at the time of image capturing. In the present embodiment, an LUT describing a correspondence relationship between luminance information and a signal value in an image capturing sensor of a camera having captured an input moving image is prepared and stored in advance for each exposure condition. Then, it is assumed that a signal value corresponding to luminance information is determined by referring to an LUT in accordance with the exposure condition at the time of image capturing (hereinafter, called "image capturing characteristics LUT"). It is possible to create the image capturing characteristics LUT by capturing various reference objects whose luminance value is different and already known under a plurality of exposure conditions and storing the captured image data in association with the luminance value and the signal value. Further, by applying predetermined gamma characteristics taking into consideration the human visual characteristics to the signal value determined by referring to the image capturing characteristics LUT, the conversion into the pixel value (here, RGB value) is performed. Consequently, by tracing the course of the conversion reversely, it is also possible to convert the RGB value into luminance information. A specific conversion procedure at this time is as follows. First, by performing inverse conversion with the above-described gamma characteristics for the RGB value, the RGB value is converted into a signal value. Then, the signal value is converted into luminance information by acquiring and referring to the exposure condition at the time of image capturing of the input moving image and the image capturing characteristics LUT at that time. In this manner, luminance information on each pixel position in each frame of the input moving image is obtained. It may also be possible to create in advance the image capturing characteristics LUT taking into consideration the operation by the gamma characteristics and to enable inter-conversion between the RGB value and the luminance information by one-time processing. In either case, at this conversion step, conversion is performed so that, for example, in a case of (R, G, B)=(10000, 22000, 16000), (X, Y, Z)=(2200, 4000, 3500) is obtained, in a case of (R, G, B)=(1700, 3200, 2500), (X, Y, Z)=(500, 630, 600) is obtained, and so on.

At S904, the print image is generated from the input moving image by the print image generation unit 203. Details of the generation of the print image are already explained at S304 to S309 of the flow in FIG. 3 of the first embodiment, and therefore, explanation is omitted.

Next, at S905, the reflectance information derivation unit 802 derives reflectance information from the print image generated at S904. Here, the reflectance information is data in the array format like an image having the same size as that of the print image and as the pixel value thereof, the reflectance information has a value not less than 0 and not more than 1, which represents the reflectance of the printed matter (for XYZ) in a case where the print image is output by the printer 109. Here, the way of thinking at the time of deriving reflectance information from a print image is explained. Here, it is assumed that the printer 109 is an ink jet printer. In a case of the ink jet scheme, printed matter is obtained by ejecting color materials (inks) onto a printing medium (sheet) in accordance with the RGB value specified by print image data and by the ejected inks penetrating into the sheet and fixing therein. The color of the printed matter is represented by the reflectance on the sheet surface changing in accordance with the ink having fixed. Consequently, the RGB value of the print image data, which is input to the printer 109, and the reflectance of the sheet (printed matter) correspond to each other. Then, in the present embodiment, the reflectance information is obtained from the print image by preparing and storing in advance an LUT (hereinafter, referred to as "print characteristics LUT") in which the correspondence relationship between the RGB value of the print image and the reflectance on the printed matter is described and by referring to the print characteristics LUT. The print characteristics LUT is data indicating the characteristics across the entire range of the RGB value, in which that in a case where the printer 109 outputs a specific RGB value for a certain pixel, the pixel has specific reflectance for XYZ is specified in association. For example, such a correspondence relationship is specified in which in a case where the input value is (R, G, B)=(0, 0, 0), the reflectance is (0.023, 0.025, 0.020), in a case where the input value is (46260, 46260, 46260), the reflectance is (0.40, 0.42, 0.38), and so on. It is possible to create the print characteristics LUT by printing an outputting a patch chart having various RGB values by the printer 109, measuring the reflectance of the output patch by using a colorimeter, and storing the RGB value and the reflectance in association with each other.

At S906, the projection image generation unit 803 reconstructs the moving image to be projected onto the printed matter by the projector 110 from the input moving image based on the luminance information derived at S903 and the reflectance information derived at S905. Here, the way of thinking at the time of generating the projection image from the input moving image is explained. First, the luminance in the reproduced image obtained by the projection image being projected onto the printed matter in an overlapping manner is represented by equation (1) below.

$$\text{luminance in reproduced image} = \text{luminance of light illuminating reproduced image} \times \text{reflectance of printed matter} \quad \text{equation (1)}$$

However, here, it is assumed that ambient light is ignored and it is possible to approximate the light illuminating the reproduced image only to the projection light by the projector 110. That is, "luminance of light illuminating reproduced image"="luminance to be projected by projector". Then, it is assumed that the target to be reproduced in the reproduced image is the scene itself represented by the input moving image (scene-faithful reproduction). The target in this case is equal to the luminance information derived at S903. Consequently, a relationship of "luminance in reproduced image"="target to be reproduced"="derived luminance information" holds. Further, the reflectance of the printed matter is acquired as the reflectance information at S905. Then, because of the faithful reproduction of the target, it is possible to represent the luminance to be projected by the projector 110 by equation (2) below.

$$\text{luminance to be projected by projector} = \text{luminance information} \div \text{reflectance information} \quad \text{equation (2)}$$

Here, the right side of the above-described equation (2) is already known, and therefore, it is possible to find the left side. That is, the result of dividing the target luminance by the reflectance of the printed matter is the luminance in the moving image to be projected. In this manner, the luminance to be projected by the projector 110 is known. In the present embodiment, the XYZ value is obtained as the luminance information and the Y component is shown as an example. For example, it is assumed that the XYZ value=(500, 630, 600) is found from the RGB value=(1700, 3200, 2500) of the input moving image at a certain pixel position (x, y). In this case, the target to be reproduced of the Y component is "630". Next, it is assumed that the RGB value I (x, y) of the print image at the above-described pixel position (x, y) is determined as I (x, y)=(46260, 46260, 46260). The reflectance for the value of the Y component in the print image at this time is "0.42" as described previously. The value of the Y component to be reproduced finally in the reproduced image is "630" and the reflectance at that portion is "0.42", and therefore, the value of the Y component to be projected by the projector is found as 630÷0.42=1,500.

Then, the luminance to be projected by the projector 110 is known, and therefore, the pixel value (RGB value) of the projection image is found from the luminance. In the present embodiment, an LUT (hereinafter, called "projection characteristics LUT") in which a correspondence relationship between the pixel value of the projection image input to the projector 110 and the luminance information (XYZ) on the light to be projected is described is prepared and stored in advance. Then, by referring to the projection characteristics LUT, the RGB value of each frame of the projection image is obtained from the luminance (XYZ value) to be projected by the projector. The projection characteristics LUT is an LUT specifying the relationship between the input pixel value (RGB value) to the projector 110 and the XYZ value in the projection image for the entire range of the pixel value. For example, in a case where the input pixel value is (R, G, B)=(12000, 12000, 12000), (X, Y, Z)=(240, 250, 270) is obtained. Further, in a case where (R, G, B)=(23000, 23000, 23000), (X, Y, Z)=(1400, 1500, 1600) is obtained. The correspondence relationship such as this is specified. It is possible to create the projection characteristics LUT by projecting and outputting a patch chart having various RGB values by the projector 110, measuring the luminance (XYZ value) of the output patch by using a colorimeter, and storing the RGB value and the XYZ value in association with each other. Then, by referring to the projection characteristics LUT such as this, the luminance to be projected by the projector 110 is converted into the RGB value of each frame of the projection image. For example, in a case where the luminance value to be projected by the projector is (X, Y, Z)=(1400, 1500, 1600), from the specific example of the projection characteristics LUT described above, it is known to perform conversion into (R, G, B)=(23000, 23000, 23000).

There may be a case where the "luminance to be projected by the projector", which is an input value, exceeds the luminance that can be output by the projector 110 in the conversion using the projection characteristics LUT. In the case such as this, it is not possible to convert the luminance as it is into the RGB value, which is the output value of the projection image, and therefore, it is better to perform conversion after performing the processing, such as clipping, linear compression, and gamma correction, for the "luminance to be projected by the projector". Lastly, by encoding the set of the pixel values in units of frames thus obtained into an appropriate moving image format, a projection image is completed.

The above is the contents of the image processing of the present embodiment, in which reconstruction of an optimum projection image is also performed, in addition to generation of a print image.

Modification Example

In the present embodiment, by referring to the image capturing characteristics LUT corresponding to the exposure condition at the time of capturing the input moving image, the luminance information is obtained from the input moving image. However, what is required is that it is possible to obtain the luminance information corresponding to the input moving image at S903, and therefore, the method is not limited to the example described above. For example, it may also be possible to include a reference object whose luminance information is already known at the time of capturing the input moving image and to obtain the XYZ value from the RGB value of the entire input moving image by taking the RGB value of the reference object portion as a reference.

Further, for example, the image capturing characteristics LUT that is referred to in order to obtain the luminance information is normally a 3-to-3 LUT between RGB and XYZ, but the LUT is not limited to this. It may also be possible to prepare three kinds of one-dimensional LUT, that is, R-X, G-Y, and B-Z, and to apply these LUTs by making use of the fact that the tendency is similar on the whole between the RGB color space and the XYZ color space. Further, it may also be possible to prepare only one kind of LUT, such as white light luminance (=Y), and to apply the LUT to three pairs of R-X, G-Y, and B-Z. Due to this, it is possible to simplify creation of the image capturing characteristics LUT and conversion processing using the image capturing characteristics LUT.

As above, according to the present embodiment, a projection image that is projected onto printed matter in an overlapping manner is reconstructed based on a generated print image by also taking into consideration the printing characteristics of a printer and the projection characteristics of a projector. Due to this, it is made possible to obtain a reproduced image more faithful to the scene of the input moving image.

Third Embodiment

In the first and second embodiments, the print image is generated by referring to the RGB value of each frame of the input moving image. In this case, the processing is comparatively simple, but the color specified by the RGB value and the appearance (visual impression) of the image do not necessarily coincide well with each other. Consequently, an aspect is explained as a third embodiment in which a print image further taking into consideration a visual impression is generated. Explanation of the contents in common to those of the first and second embodiments is omitted and in the following, different points are explained mainly.

In the present embodiment, an example is explained in which the print image generation unit 230 generates a print image from an input moving image by performing image processing via the L*a*b* color space, which is one of uniform color spaces. Hereinafter, for simplification, * is omitted and "L*a*b*" is simply described as "Lab".

Figure 10:
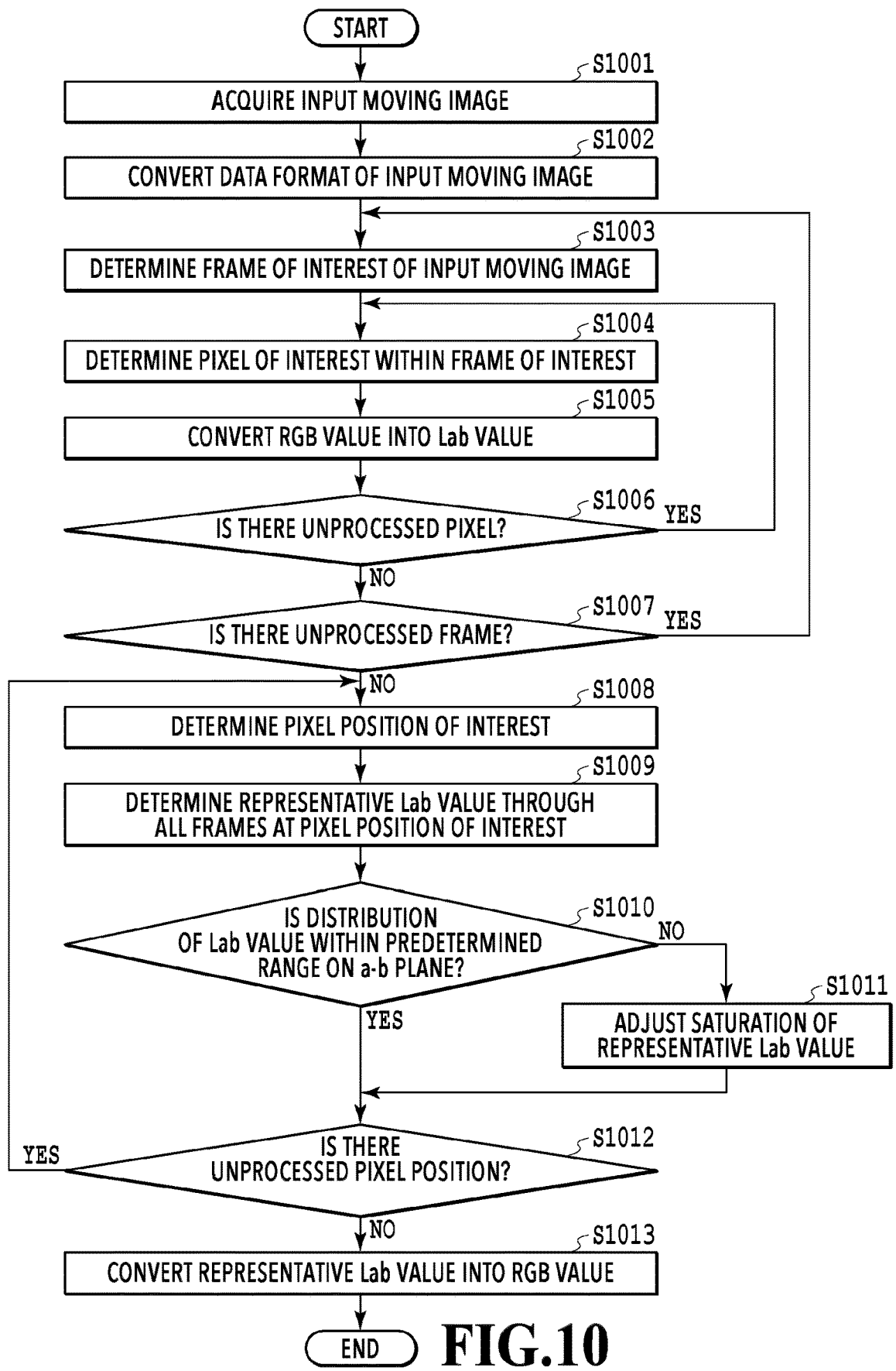
FIG. 10 is a flowchart showing a flow of print image generation processing according to a third embodiment.

FIG. 10 is a flowchart showing a flow of print image generation processing according to the present embodiment, which corresponds to the flow in FIG. 3 of the first embodiment. In the following, detailed explanation is given with reference to the flow in FIG. 10.

S1001 and S1002 correspond to S301 and S302, respectively, in the flow in FIG. 3 of the first embodiment. That is, after input moving image data is stored in the RAM 102 by the buffer processing unit 201, the input moving image data is converted into moving image data in which each pixel within a frame has the RGB value by the data format conversion unit 202.

At S1003, a frame of interest is determined from all the frames configuring the input moving image. At S1004, a pixel of interest within the frame of interest is determined. Usually, the pixel of interest is determined in order from the pixel located at the top left of the frame. At S1005 that follows, the RGB value of the pixel of interest is converted into the Lab value. This conversion is performed by preparing and storing in advance a LUT in which the color reproduction characteristics of the printer 109, that is, the value in the Lab color space corresponding to the RGB value to be input to the printer 109 is described, and by referring to the LUT. This LUT is the "color reproduction characteristics LUT" shown in FIG. 2. In the color reproduction characteristics LUT, a relationship, such as one in which in a case where the RGB value is (25000, 25000, 25000), the Lab value is (41.0, 0.33, 0.82), in a case where the RGB value is (65535, 0, 0), the Lab value is (53.9, 68.9, 52.0), and so on, is specified. This color reproduction characteristics LUT is obtained by outputting a patch chart of various RGB values by the printer 109, measuring the output patch by a colorimeter, and storing the RGB value and the Lab value in association with each other. Then, at S1006, whether the processing is completed for all the pixels within the frame of interest is determined. In a case where there is an unprocessed pixel, the processing returns to S1004, and the next pixel of interest is determined and the processing is continued. In a case where all the pixels are processed, the processing advances to S1007. At S1007, whether the processing is completed for all the frames of the input moving image is determined. In a case where there is an unprocessed frame, the processing returns to S1003, and the next frame of interest is determined and the processing is continued.

In a case where the processing up to this step is completed and the Lab values of all the pixels of all the frames of the input moving image are obtained, the processing advances to S1008. The Lab value of each pixel after the conversion means the Lab value corresponding to each pixel in a case where each frame of the input moving image is printed and output from the printer 109. Here, it is assumed that the RGB value of the frame at time t of the input moving image is represented as V (t, x, y) and the Lab value of the frame at time t after the conversion is represented as L (t, x, y).

Figure 11:
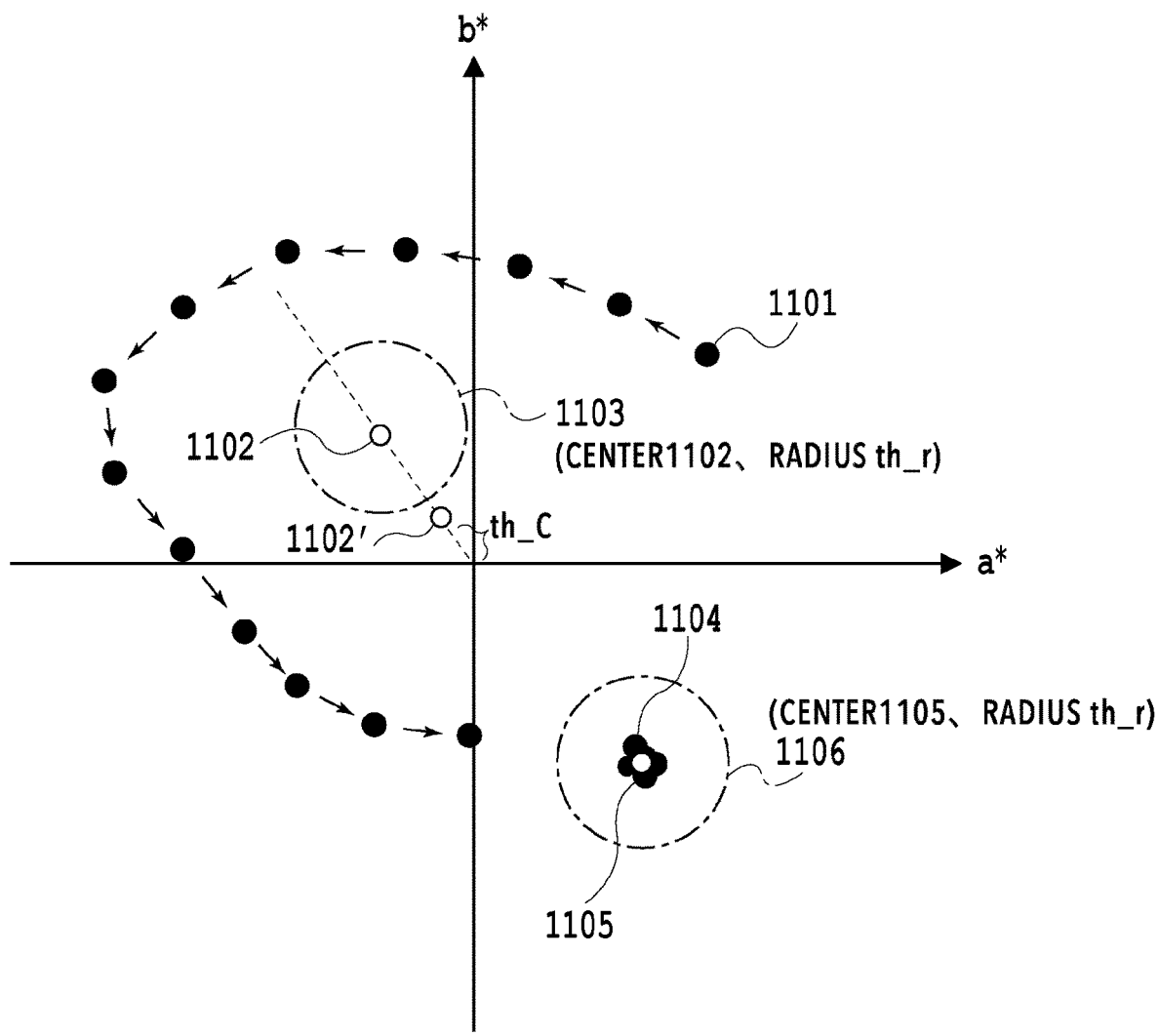
FIG. 11 is an explanatory diagram of a representative Lab value.

At S1008, the pixel position of interest (x, y) is determined. At S1009 that follows, the representative Lab value through all the frames at the pixel position of interest (x, y) is found. Specifically, a distribution average of L (t, x, y) across all the frames at the pixel position of interest (x, y) is found and the Lab value at the pixel position is taken as the representative Lab value. Hereinafter, the representative Lab value is described as L_rep (x, y). FIG. 11 is an explanatory diagram of the representative Lab value and on the a-b plane of the Lab color space, a distribution of the Lab value that changes with time at two kinds of arbitrary pixel position, that is, (x1, y1) and (x2, y2), is indicated by black circle plot points. A plot point group 1101 is a distribution example of the Lab value for a certain pixel whose color changes comparatively. Then a solid white point 1102 indicates a distribution average (average Lab value) of the plot point group 1101. The Lab value at the solid white point 1102 is adopted as a representative Lab value (L_rep (x1, y1)) at the arbitrary pixel position (x1, y1). On the other hand, a plot point group 1104 is a distribution example of a pixel whose change in color is comparatively small. Then, a solid white point 1105 indicates a distribution average (average Lab value) of the plot point group 1104. The Lab value at the solid white point 1105 is adopted as a representative Lab value (L_rep (x2, y2)) at the arbitrary pixel position (x2, y2).

At next S1010, whether the distribution of the Lab value through all the frames at the pixel position of interest (x, y) is included within a predetermined range on the a-b plane is determined. This determination is for checking whether the pixel of interest is a pixel whose change in color is large or a pixel whose change in color is small. In the present embodiment, whether or not the distribution range on the a-b plane of the Lab value (L (t, x, y)) through all the frames at the pixel position of interest (x, y) is included inside a circle having a predetermined radius of th_r with the representative Lab value as a center. In the example in FIG. 11, whether or not the distribution range of the plot point group 1101 is included inside a circle 1103 and the distribution range of the plot point group 1104 is included inside a circle 1106 are determined, respectively. As actual processing, it is sufficient to check whether the distance on the a-b plane between the Lab value and the representative Lab value at each plot point is less than or equal to a predetermined threshold value of th_r. In the example in FIG. 11, for the plot point group 1101, the distribution range is not included inside the circle 1103, and therefore, it is determined that the pixel of interest is a pixel whose change in color is large. On the other hand, for the plot point group 1104, the distribution range is included inside the circle 1106, and therefore, it is determined that the pixel of interest is a pixel whose change in color is small. At this time, which value the radius th_r of the circle is set to is arbitrary and the radius is determined with reference to the relationship between a color difference $\Delta E$ and visual characteristics. For example, such a value as th_r=10 is set. In a case where the results of the determination indicate that the distribution of the Lab value through all the frames at the pixel position of interest is included within the predetermined range on the a-b plane, the processing advances to S1012. On the other hand, in a case where it is determined that the distribution is not included within the predetermined range, the processing advances to S1011.

At S1011, processing to adjust the representative Lab value of each pixel determined at S1109 so that saturation is reduced while keeping brightness and hue. In the present embodiment, an upper limit value of th_C of the saturation is determined in advance and the value of L_rep (x, y) is adjusted so that the saturation of the representative Lab value (L_rep (x, y)) becomes lower than or equal to the upper limit th_C. Specifically, the representative Lab value is reduced so that the distance from the origin does not exceed the upper limit value th_C while keeping the inclination from the origin on the a-b plane of the representative Lab value. This is equivalent to moving the solid white point 1102 to a solid white point 1102' whose distance from the origin is equal to the upper limit value th_C. Due to this, it is possible to reduce the saturation of the pixel in the print image, which corresponds to a pixel of the input moving image, whose change in color is comparatively large. In a case where the saturation of the representative Lab value is lower than the upper limit value th_C, the adjustment of saturation is not performed. The reason is that in the pixel, the change in color is comparatively large, but the change is in the vicinity of achromatic color, and therefore, the saturation is sufficiently low already and the degree of necessity to reduce saturation is low. Which value the upper limit value th_C is set to at the time of determining whether or not saturation adjustment is necessary is arbitrary and for example, it is sufficient to set the value to the same value as th_r specifying the radius of the above-described circle.

At S1012, whether the processing is completed for all the pixel positions is determined. In a case where there is an unprocessed pixel position, the processing returns to S1008, and the next pixel position of interest (x, y) is determined and the processing is continued. In a case where the processing is completed for all the pixel positions, the processing advances to S1013.

At S1013, the representative Lab values of all the pixels are converted into the RGB values. It may be possible to perform this conversion by performing inverse conversion using the color reproduction characteristics LUT described previously. In this manner, the image in which each pixel has the RGB value, which is obtained by performing the image processing via the Lab color space, a uniform color space, is output as the print image.

The above is the contents of the print image data generation processing according to the present embodiment.

Modification Example

In the present embodiment, even in a case where it is determined that the change in color is large (Yes at S1010), on a condition that the saturation of the representative Lab value is lower than the upper limit value determined in advance, the saturation is regarded as being sufficiently low and the saturation adjustment is not performed. However, it may also be possible to perform predetermined saturation reduction processing in a case where the change in color is larger than or equal to a predetermined level. For example, the representative Lab value is changed so as to coincide with the Lab value whose saturation is the minimum of the Lab values distributed on the a-b plane, the saturation of the representative Lab value is multiplied by a predetermined reduction constant (for example, 0.5), and so on. As described above, it may also be possible to perform the adjustment processing to reduce saturation for all the pixels whose change in color is larger than or equal to a predetermined level.

Further, in the present embodiment, in order to check whether the pixel of interest is a pixel whose change in color is large or a pixel whose change in color is small, whether or not the distribution of the Lab value is included within the predetermined circle on the a-b plane from the representative Lab value is determined. However, the determination method is not limited to this and for example, it may also be possible to find the hue angle of the distribution of the Lab value and to determine whether or not the difference between the maximum value and the minimum value of the hue angle is included within a predetermined range.

Further, in the present embodiment, after all the pixel values of all the frames are converted into the Lab values, the representative Lab value at each pixel position is determined and the adjustment to change the representative Lab value from the point of view of saturation and hue is performed. However, for example, it may also be possible to perform processing in the form of the flow in FIG. 3 of the first embodiment. That is, first, as the initial value of all the pixel values of the print image, all the pixel values after the color conversion in the top frame of the input moving image are adopted. Next, in the frame at each time t of the input moving image, the RGB value of each pixel is converted into the Lab value. Then, for each pixel, the Lab value is updated so that the value that is larger is left for the L component and the value whose absolute value is smaller is left for the a component and the b component, respectively. This is performed for all times t and the Lab value of each pixel, which is left finally, is converted into the RGB value and this is taken at the print image. By doing the above, the similar print image as that of the present embodiment is also obtained.

Further, in the present embodiment, by using the color reproduction characteristics LUT of the printer, the Lab value for generating the print image is derived. However, for example, it may also be possible to handle the RGB value of each frame of the input moving image as, for example, the value in the device-independent sRGB color space and to find the Lab value from a predetermined calculation equation on the assumption of a light source environment, such as D50.

According to the present embodiment, the brightness, saturation, and hue of the pixel in each frame are determined via a uniform color space closer to human senses, and therefore, compared to the first embodiment, it is possible to evaluate which frame has higher saturation and the like with a higher accuracy.

Fourth Embodiment

In the embodiments described above, the print image is generated based on only the frame configuring the input moving image. Next, an aspect is explained as a fourth embodiment, in which a print image is generated by adding information specified by a user. In the following, explanation is given based on the third embodiment, however, it is also possible to combine the present embodiment with the first and second embodiments. Explanation of the contents in common to those of the preceding embodiments is omitted and in the following, different points are explained mainly.

Figure 12:
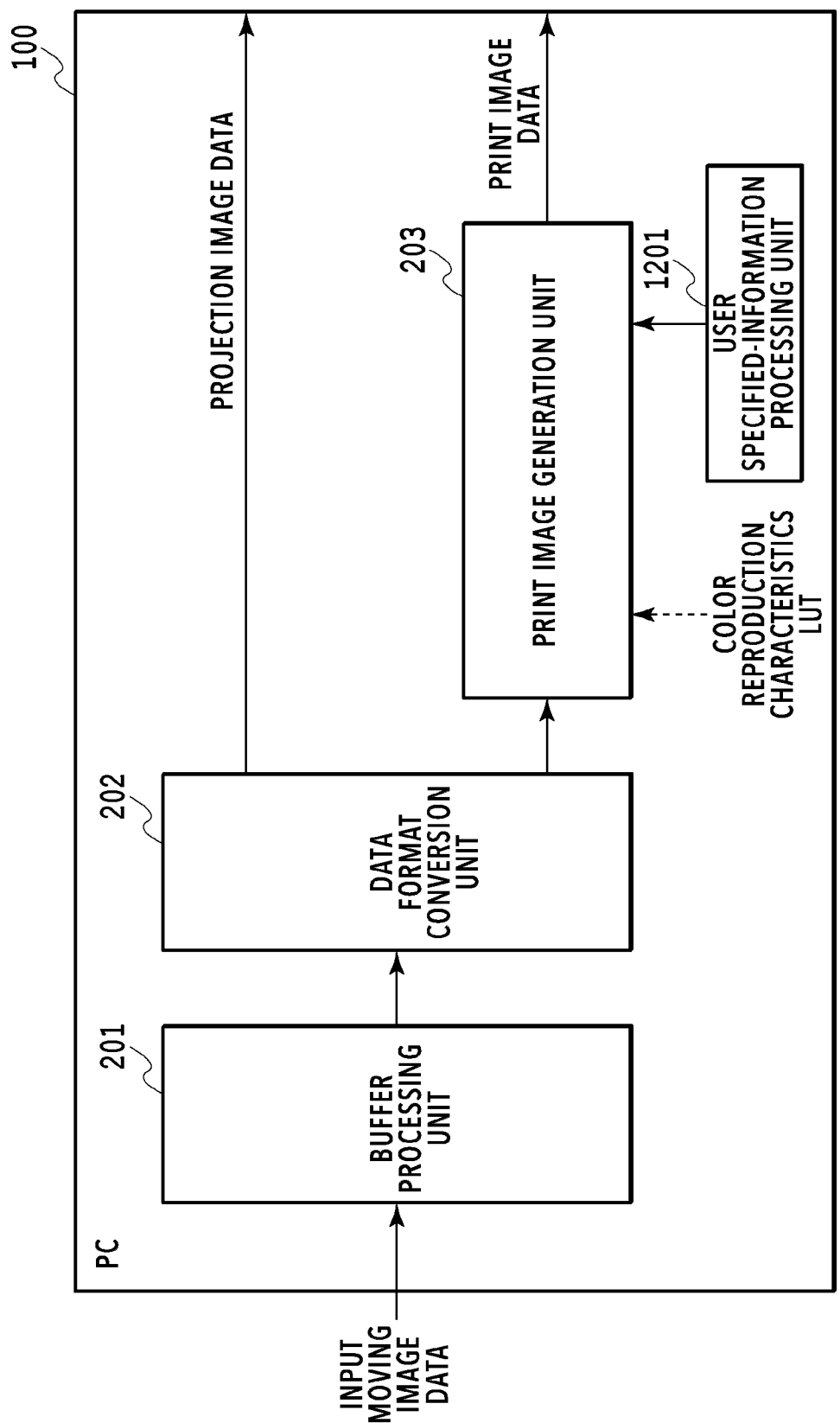
FIG. 12 is a function block diagram showing a software configuration of a PC according to a fourth embodiment.
Figure 13:
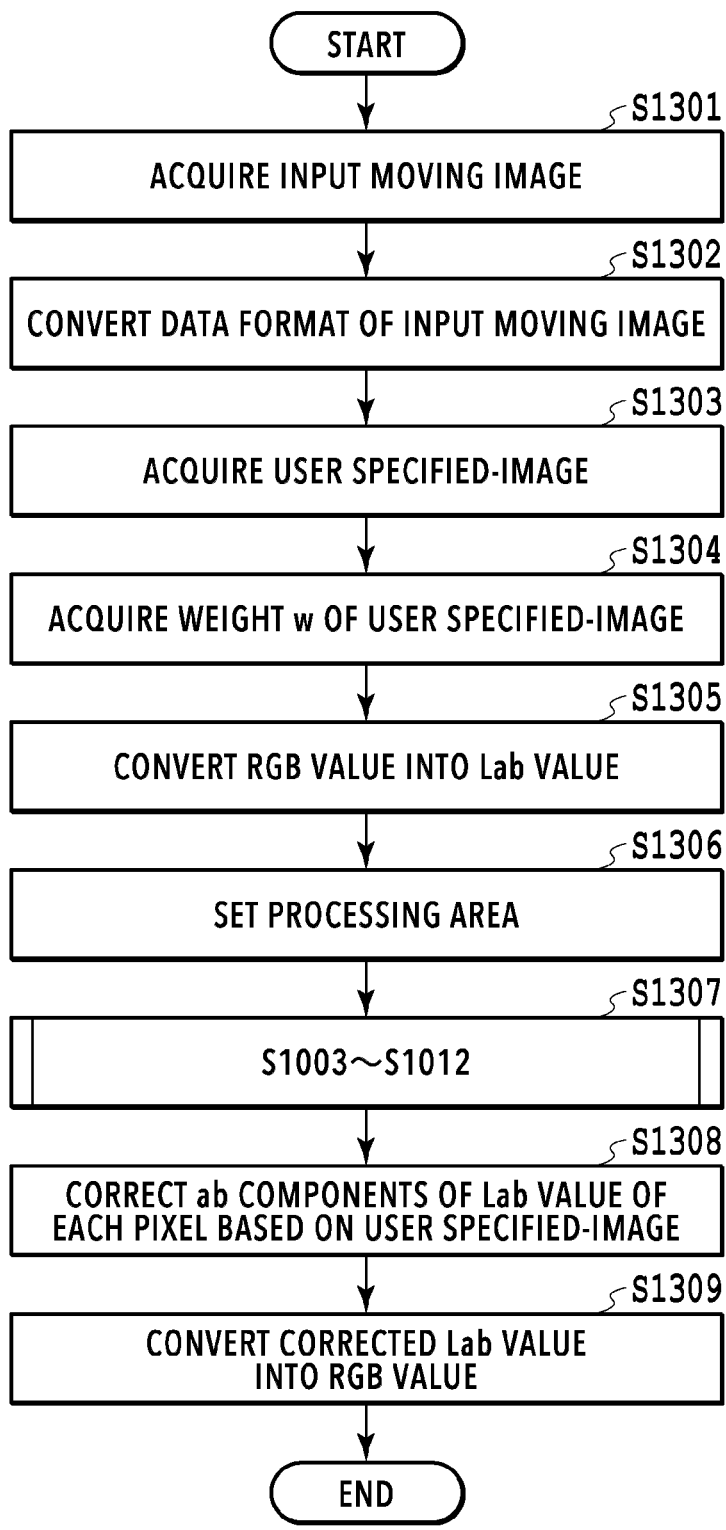
FIG. 13 is a flowchart showing a flow of print image generation processing according to the fourth embodiment.

FIG. 12 is a function block diagram showing a software configuration of the PC 100 based on FIG. 2 described previously according to image processing of the present embodiment. The PC 100 of the present embodiment includes the buffer processing unit 201, the data format conversion unit 202, the print image generation unit 203, and a user specified-information processing unit 1201. Compared to the function block diagram in FIG. 2 on which FIG. 12 is based, a large different lies in that the user specified-information processing unit 1201 is added. The user specified-information processing unit 1201 receives a still image reflecting the intention of a user for a print image and area specification instructions to limit the area for which image processing is performed to a part of the area via a user interface and delivers them to the print image generation unit 203 as user specified-information. Then, the print image generation unit 203 of the present embodiment generates a print image in accordance with the user specified-information. FIG. 13 is a flowchart showing a flow of print image generation processing according to the present embodiment. In the following, explanation is given along the flow in FIG. 13.

S1301 and S1302 correspond to S1001 and S1002, respectively, in the flow in FIG. 10 of the third embodiment. That is, after input moving image data is stored in the RAM 102 by the buffer processing unit 201, the input moving image data is converted into moving image data in which each pixel within a frame has the RGB value by the data format conversion unit 202.

Figure 14:
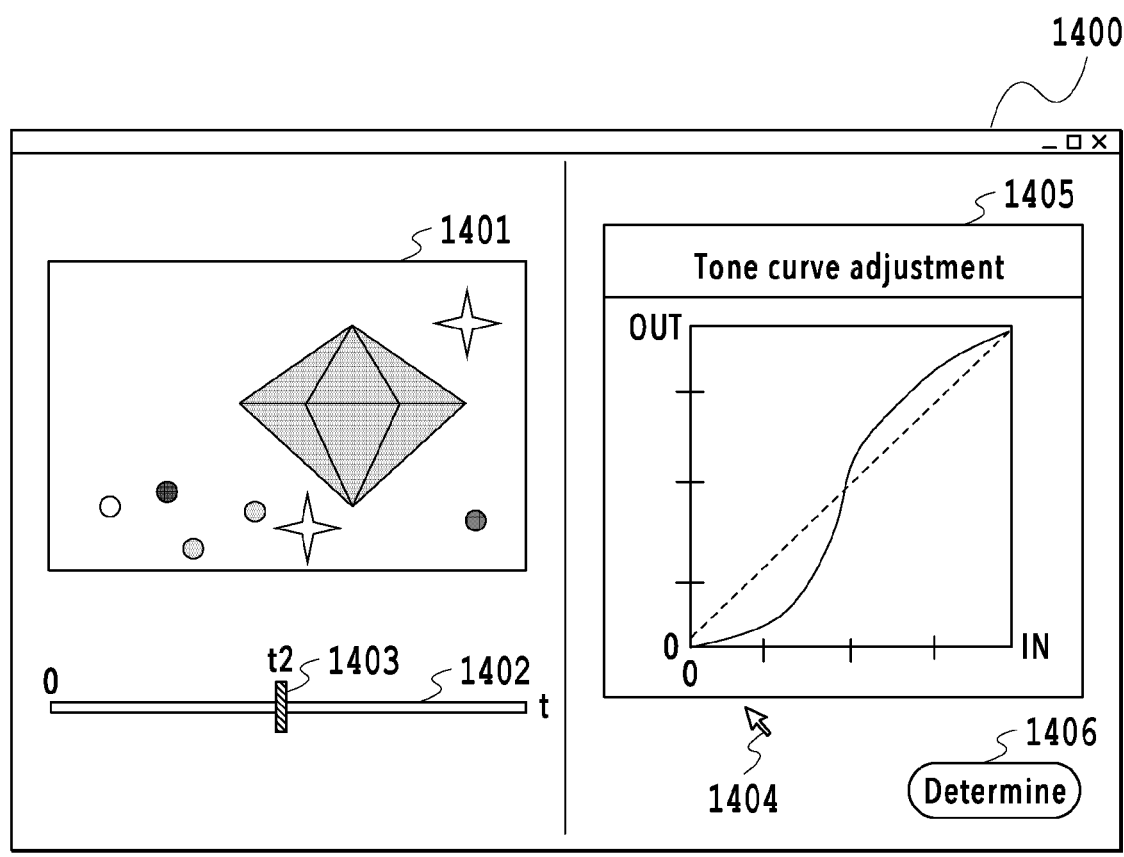
FIG. 14 is a diagram showing an example of a UI screen.

At S1303, the user specified-information processing unit 1201 acquires data of the still image specified by a user (hereinafter, called "user specified-image"). In a case of the present embodiment, one frame selected by a user from among a plurality of frames configuring the input moving image is acquired as a user specified-image. FIG. 14 is an example of a user interface screen (UI screen) that is displayed on the monitor 108 at the time of a user selecting an arbitrary frame from the input moving image. On the left side of a UI screen 1400 in FIG. 14, a display field 1401 in which an input moving image is displayed in units of frames, a seek bar 1402 corresponding to the entire time of the input moving image, and a slider 1403 indicating which position the frame being displayed is located at for the entire time exist. The position of the slider 1403 and the frame being displayed are interlocked with each other and a user selects a desired frame by moving the slider 1403 by operating a cursor 1404 with a mouse or the like. Further, on the right side of the UI screen 1400, an instruction field 1405 for performing color tone correction for the frame being displayed relating to the user selection exists. In the example in FIG. 14, as one example of color tone correction, a graph for adjusting a tone curve is displayed in the instruction field 1405. It is possible for a user to correct a color tone into a desired color tone by performing a drug operation with the mouse or the like by putting the cursor 1404 on the tone curve. In a case where a user presses down a Determine button 1406 at the point in time at which a frame with a preferred color tone is obtained, the frame for which the color tone correction has been performed is acquired as a user specified-image.

At S1304, the user specified-information processing unit 1201 acquires a weight w for the user specified-image acquired at S1303. It is assumed that the weight w is a real number not smaller than 0 and not larger than 1 (0≤w≤1). It may also be possible to acquire a specified value determined in advance or for a user to specify an arbitrary value. Here, subsequent explanation is given on the assumption that w=0.5 is acquired.

At S1305, as at S1005 in the flow in FIG. 10 of the third embodiment, the RGB value in the user specified-image acquired at S1303 is converted into the Lab value by referring to the color reproduction characteristics LUT.

Figure 15:
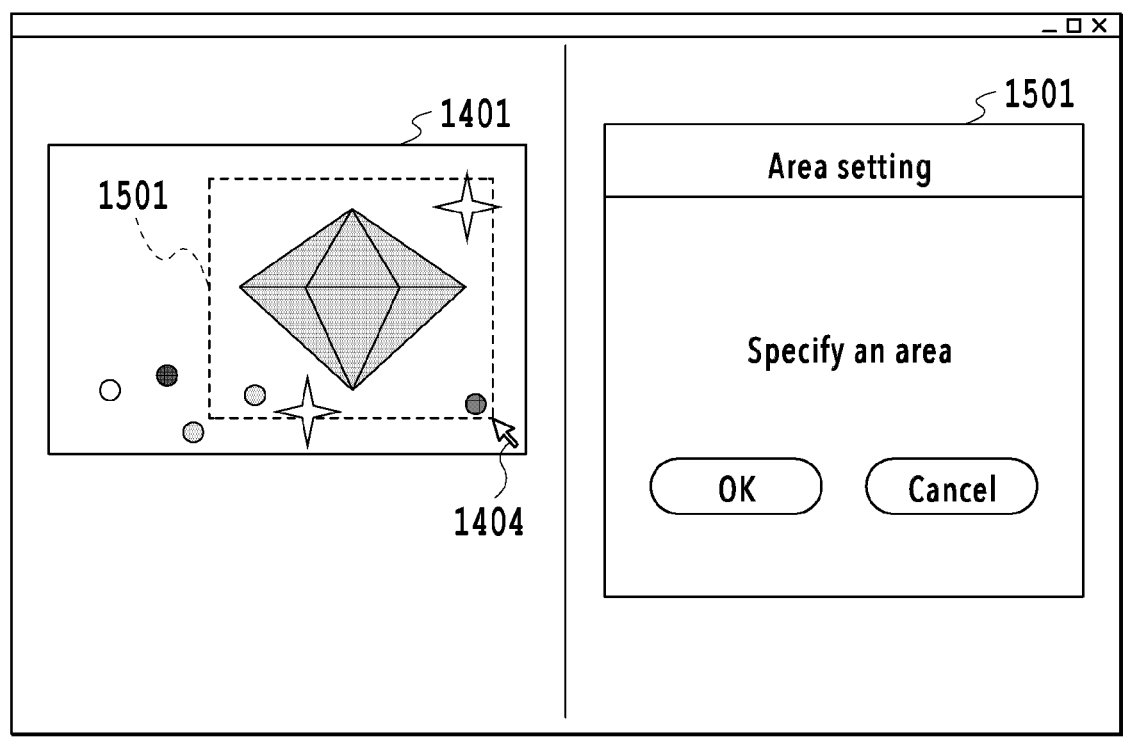
FIG. 15 is a diagram showing an example of the UI screen.

At S1306, the user specified-information processing unit 1201 sets a processing area for each frame of the input moving image. FIG. 15 is an example of a UI screen at the time of a user specifying a specific area for the frame being selected (drawing of elements not in relation to this step is omitted). A user draws a rectangle 1501 within a target frame by operating the cursor 1404. At this time, it may also be possible to make adjustment to further limit the selected area along the contour component of an object as implemented by general image processing software (for example, GIMP or the like). In a case where a user having specified an arbitrary area presses down an OK button 1502, the area specified by the above-described rectangle 1501 is set as a processing area.

At S1307, by the print image generation unit 203, each piece of processing at S1003 to S1013 of the flow in FIG. 10 of the third embodiment is performed for the input moving image and an print image in which each pixel has the Lab value is generated. However, the calculation of the representative Lab value and the saturation adjustment thereof (S1008 to S1013) are performed only for the pixels within the processing area set at S1306 as a target. As described above, by limiting the processing-target area to the area that needs the processing (the area desired by a user or the area whose change in color is large), it is possible to reduce the total processing time.

At S1308, by referring to the weight w of the user specified-image, which is acquired at S1304, correction processing to put the Lab value of each pixel of the print image generated at S1307 (for the pixel within the processing area, the representative Lab value) closer to the Lab value of the corresponding pixel in the user specified-image is performed. Specifically, the ab components in the Lab value at a point that internally divides the coordinates on the a-b plane of the Lab value of the print image and those of the user specified-image in a ratio of w:(1−w) is taken as the ab components of the Lab value of a new print image. In a case of the present embodiment, the weight w=0.5, and therefore, the ab components of the Lab value of the new print image are the average value of the Lab value of the print image and the Lab value of the user specified-image. In a case where the value of the weight w is larger than 0.5, the ab components of the Lab value of the print image become closer to the ab components of the Lab value of the user specified-image. For the value of the L component, it is sufficient to take the value of the L component in the Lab value of the user specified-image as the value of the L component in the Lab value of the new print image.

Lastly, at S1309, the corrected Lab values of all the pixels in the print image are converted into the RGB values. This conversion processing is the same as that at S1013 in the flow in FIG. 10 of the third embodiment and it is sufficient to perform inverse conversion using the color reproduction characteristics LUT described previously. In this manner, the image in which the intention of a user is reflected more is output as the print image. The above is the contents of the print image data generation processing according to the present embodiment.

Modification Example

In the present embodiment, the rectangle, which is the processing area, is specified by a user with the mouse or the like, but it may also be possible to automatically set the processing area based on the change in color in each frame of the input moving image. Specifically, it is sufficient to scan each frame of the input moving image, to extract a pixel whose change in the pixel value as time elapses is large, and to set the pixel as the processing area. At this time, it may also be possible to present the extraction results to a user and to cause the user to set a processing area. It may also be possible to determine the magnitude of the change in the pixel value by whether or not the pixel value changes by a predetermined threshold value or more from the RGB value in a specific frame, or by whether or not the pixel value distribution in the RGB color space is included within a predetermined distance from the average value, or by combining both methods. Further, it may also be possible to enable a user to directly set a processing target for each object within a frame.

Further, in the present embodiment, only for the ab components of the Lab value of the generated print image, the processing to put the Lab value closer to the Lab value of the user specified-image based on the specified weight w and for the L component, the Lab value of the user specified-image is used. This is the result of giving priority to the intention of a user for the L component because the luminance of the reproduced image is affected also by the brightness of the print image, but not so much compared to the ab components (saturation, hue components). However, it may also be possible to put the Lab value closer to the Lab value of the user specified-image for the L component as in the case with the ab components.

Further, in the present embodiment, for the ab components of all the pixels, the ab components are rewritten by the ab components at the internally dividing point that puts the Lab value of the print image closer to the Lab value of the user specified-image based on the specified weight w. However, in a case where the color represented by the Lab value of the print image and the color represented by the Lab value of the user specified-image are colors close to each other on the Lab space, the meaning of rewriting is small and on the contrary, there is a possibility that the slight change from the color intended by a user is more influential. Consequently, in a case where the color different $\Delta E$ between the color represented by the Lab value of the print image and the color represented by the Lab value of the user specified-image is smaller than or equal to a predetermined threshold $th\_E$, it may also be possible to rewrite the Lab value of the print image by the Lab value of the user specified-image by giving priority to the intention of a user.

At this time, the threshold value $th\_E$ is arbitrary and for example, $th\_E$ may be set to 5.

Figure 16:
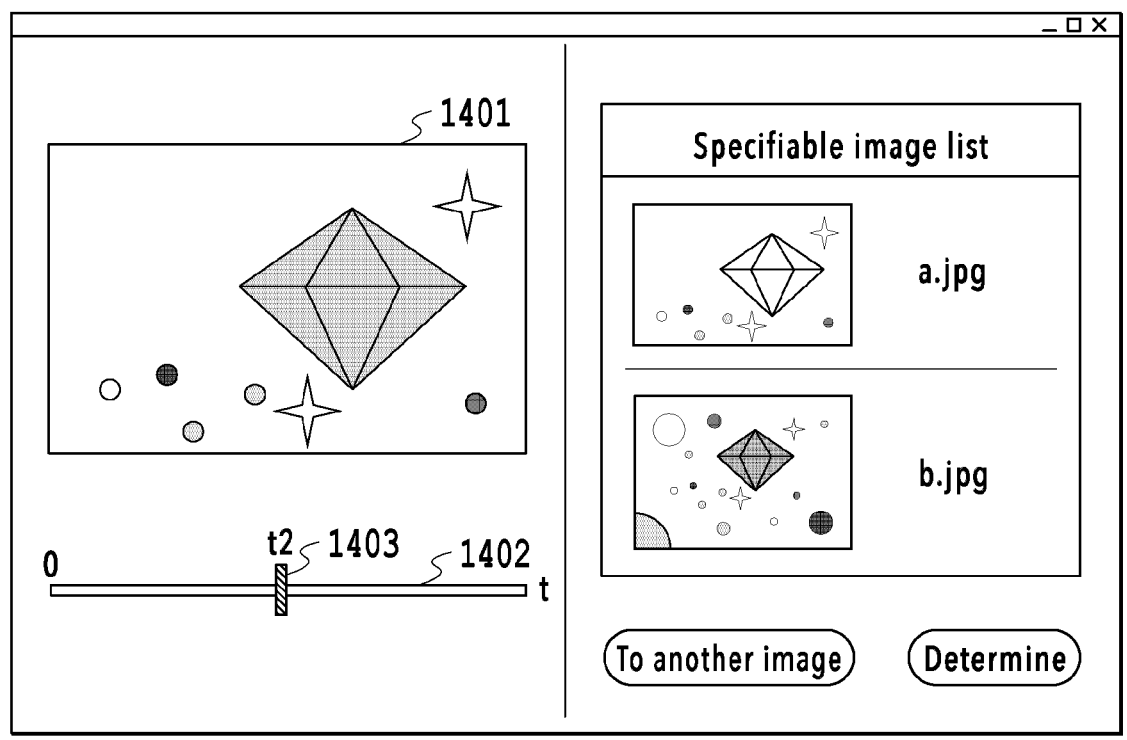
FIG. 16 is a diagram showing an example of the UI screen.

Further, in the present embodiment, the user specified-image is created based on the frame configuring the input moving image. However, the creation method is not limited to this. For example, it may also be possible to create the user specified-image based on another still image or another moving image obtained by capturing the same scene as that of the input moving image. For example, the projection image may be a moving image for projection onto only a part of the printed matter, and it may also be possible to cut out a part of the print image in accordance with the input moving image and take the cutout image as the user specified-image. At this time, it may also be possible to analyze the frame after acquiring the input moving image, estimate an image file estimated to have captured the same scene from a predetermined database, and to suggest the image file to a user as a candidate of the user specified-image (see FIG. 16). For the analysis such as this, it is possible to use a publicly known technique to calculate similarity between images. In a case where the image size is not the same, it is sufficient to perform resolution conversion processing as needed.

According to the present embodiment, printed matter in which the intention of a user is reflected more directly is obtained. Due to this, for example, it is possible to exhibit even printed matter alone in the state where no projection image is projected in an overlapping manner by the projector as printed matter with a tint intended by a user to a certain extent.

Other Embodiments

In the above-described embodiments, as a projection image in which the color of a part of an object changes, a moving image is explained as an example. However, it is possible to implement projection in which the color of an object changes similarly also by projecting a plurality of still images in a switching manner.

It is also possible to implement the present invention by supplying a program implementing one or more functions of the above-described embodiments to a system or an apparatus via a network or a storage medium and to cause one or more processors in the computer of the system or the apparatus to read and execute the program. Further, it is also possible to implement the present invention by a circuit (for example, ASIC) implementing one or more functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in a technique to project an image onto printed matter in an overlapping manner, a print image for the above-described printed matter is generated by taking into consideration the change in the projection image over time. Due to this, it is possible to suppress trouble that a portion at which it is desired to cause the change in color to occur in a reproduced image is reproduced in a dark color.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-100784, filed May 25, 2018 which is hereby incorporated by reference wherein in its entirety.

What is claimed is:

1. An image processing apparatus that generates a print image for outputting printed matter onto which two or more images are projected in an overlapping manner, the apparatus comprising:
   one or more processors; and
   one or more memories storing instructions, when executed by the one or more processors, causing the apparatus to function as:
      an acquisition unit configured to acquire an image at least including an object; and
      a first generation unit configured to perform saturation reduction processing for an area of the object in the acquired image in a case where change in color between the two or more images is larger than a predetermined threshold value and to generate the print image based on the image whose saturation is reduced by the saturation reduction processing.

2. The image processing apparatus according to claim 1, wherein
   onto the printed matter, at least a first image and a second image in which color of the object is different from that in the first image are projected successively in the overlapping manner.

3. The image processing apparatus according to claim 1, wherein
   the two or more images are frames configuring a moving image and
   in the moving image, the object changes in color in a time series.

4. The image processing apparatus according to claim 3, wherein
   the change in color is a change in hue.

5. The image processing apparatus according to claim 3, wherein
   in the saturation reduction processing, for the area of the object, the maximum pixel value through each of the frames is adopted for each channel of RGB.

6. The image processing apparatus according to claim 3, wherein
   in the saturation reduction processing, a pixel value of each channel of RGB in the area of the object whose color changes in each of the frames is rewritten to the same value.

7. The image processing apparatus according to claim 3, wherein the one or more memories storing instructions, when executed by the one or more processors, cause the apparatus to further function as
   a second generation unit configured to generate the moving image based on the print image generated by the first generation unit.

8. The image processing apparatus according to claim 7, wherein
   the second generation unit generates a moving image so that a result of dividing target luminance in a result of the projection onto the printed matter being performed by reflectance of the printed matter becomes luminance in the moving image to be projected.

9. The image processing apparatus according to claim 1, wherein
   the two or more images are represented in an RGB color space and
   the saturation reduction processing is processing to approximate a pixel value of each channel of RGB in the area of the object.

10. The image processing apparatus according to claim 9, wherein
    the saturation reduction processing is performed via a pixel value obtained by converting a pixel value represented in an RGB color space into a uniform color space.

11. The image processing apparatus according to claim 10, wherein
    the uniform color space is a Lab color space and
    the saturation reduction processing is processing to adjust a distance from the origin so as not to exceed a predetermined upper limit value while substantially keeping an inclination from the origin on an a-b plane of a pixel value represented in a Lab color space.

12. The image processing apparatus according to claim 1, wherein
    the saturation reduction processing is performed by excluding an edge portion of the area of the object.

13. The image processing apparatus according to claim 1, further comprising:
    a user interface receiving specification relating to generation of the print image, wherein
    the first generation unit generates the print image based on information specified via the user interface.

14. The image processing apparatus according to claim 13, wherein
    the information specified by a user via the user interface is data of a still image at least including the object whose color changes, in which intention of the user for the print image is reflected and
    the first generation unit generates the print image by performing processing to put the print image close to the still image.

15. The image processing apparatus according to claim 13, wherein
    the information specified by a user via the user interface is information relating to an area for which the saturation reduction processing is performed and
    the first generation unit performs the saturation reduction processing for an area specified by the information.

16. A method in an image processing apparatus that generates a print image for outputting printed matter onto which two or more images are projected in an overlapping manner, the method comprising the steps of:

acquiring an image at least including an object;

performing saturation reduction processing for an area of the object in the acquired image in a case where change in color between the two or more images is larger than a predetermined threshold value; and generating the print image based on the image whose saturation is reduced by the saturation reduction processing.

17. A non-transitory computer readable storage medium storing a program for causing a computer to perform a method in an image processing apparatus that generates a print image for outputting printed matter onto which two or more images are projected in an overlapping manner, the method comprising the steps of:

acquiring an image at least including an object;

performing saturation reduction processing for an area of the object in the acquired image in a case where change in color between the two or more images is larger than a predetermined threshold value; and generating the print image based on the image whose saturation is reduced by the saturation reduction processing.

* * * * *